US012613342B2

(12) United States Patent
Wang et al.

(10) Patent No.: US 12,613,342 B2
(45) Date of Patent: Apr. 28, 2026

(54) METHODS AND APPARATUS WITH HARDWARE LOGIC FOR PRE-PROCESSING LiDAR DATA

(71) Applicant: Motional AD LLC, Boston, MA (US)

(72) Inventors: Ting Wang, Santa Monica, CA (US);
Yu Ming Kan, Torrance, CA (US);
Sourabh Vora, Marina del Ray, CA (US)

(73) Assignee: Motional AD LLC, Boston, MA (US)

( * ) Notice: Subject to any disclaimer, the term of this patent is extended or adjusted under 35 U.S.C. 154(b) by 426 days.

(21) Appl. No.: 18/306,917

(22) Filed: Apr. 25, 2023

(65) Prior Publication Data

US 2023/0341554 A1 Oct. 26, 2023

Related U.S. Application Data

(60) Provisional application No. 63/334,740, filed on Apr. 26, 2022.

(51) Int. Cl.
*G01S 17/89* (2020.01)

(52) U.S. Cl.
CPC ................................... *G01S 17/89* (2013.01)

(58) Field of Classification Search
CPC .......... G01S 17/86; G01S 17/87; G01S 17/89;
G01S 17/931; G01S 7/003; G01S 7/4808;
G06V 20/56
USPC ........................................................ 702/127
See application file for complete search history.

(56) References Cited

U.S. PATENT DOCUMENTS 8,908,035 B2 * 12/2014 Russ ........................ H04N 7/18
348/148

FOREIGN PATENT DOCUMENTS

WO WO 2021/262603 A1 12/2021

OTHER PUBLICATIONS

"U-Net: Convolutional Networks for Biomedical Image Segmentation", Uni Freiburg, Vision—Pattern Recognition and Image Processing, webpage accessed Sep. 6, 2023, in 2 pages. URL: https://lmb.informatik.uni-freiburg.de/people/ronneber/u-net/#:~:text=The%20u%2Dnet%20is%20convolutional,and%20precise%20segmentation%20of%20images.&text=U%2Dnet%20architecture%20.
SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
(Continued)

*Primary Examiner* — John H Le
(74) *Attorney, Agent, or Firm* — Knobbe, Martens, Olson & Bear, LLP

(57) ABSTRACT

Disclosed is an apparatus including an input interface. The input interface is configured to obtain input sensor data. For example, the input sensor data includes light detection and ranging (LiDAR) data indicative of an environment. The apparatus includes a pre-processor communicatively coupled to the input interface. The pre-processor optionally includes a parser logic. The pre-processor includes a decoder communicatively coupled to the parser logic. The segmentation logic is configured to parse the input sensor data. The decoder is configured to decode the parsed input sensor data. The pre-processor is configured to provide the decoded input sensor data and the parsed input sensor data to a processor for fusion.

16 Claims, 11 Drawing Sheets

(56) References Cited

OTHER PUBLICATIONS

Ronneberger, O. et al., "U-Net: Convolutional Networks for Bio-medical Image Segmentation", International Conference on Medical Image Computing and Computer-Assisted Intervention, May 2015, arxiv.org/abs/1505.04597, in 8 pages.

Ronneberger, O. et al., "U-Net: Convolutional Networks for Bio-medical Image Segmentation", International Conference on Medical Image Computing and Computer-Assisted Intervention, Oct. 2015, pp. 234-241.

Wu, T. et al., "Detailed Analysis on Generating the Range Image for LiDAR Point Cloud Processing", Electronics, May 2021, vol. 10, in 12 pages.

Yu, F. et al., "Deep Layer Aggregation", Computer Vision and Pattern Recognition, Jan. 2019, arXiv:1707.06484v3, in 10 pages.

International Search Report and Written Opinion received for PCT Application No. PCT/US2023/019865, mailed Feb. 5, 2024.

International Preliminary Report received for PCT Application No. PCT/US2023/019865, mailed Nov. 7, 2024.

* cited by examiner

900

902    Receive input sensor data

904    Parse the input sensor data

906    Decode the parsed input sensor data

908    Send the decoded input sensor data and the parsed input sensor data to a processor

METHODS AND APPARATUS WITH HARDWARE LOGIC FOR PRE-PROCESSING LiDAR DATA

INCORPORATION BY REFERENCE

This application claims priority to U.S. Provisional Application No. 63/334,740, filed on Apr. 26, 2022 and titled "METHODS AND APPARATUS WITH HARDWARE LOGIC FOR PRE-PROCESSING LIDAR DATA," the disclosure of which is hereby incorporated by reference in its entirety for all purposes. Any and all applications for which a foreign or domestic priority claim is identified in the Application Data Sheet as filed with the present application are hereby incorporated by reference under 37 CFR 1.57.

BACKGROUND

LiDAR data processing, such as point cloud fusion, is carried out for object detection in software. This requires the software to handle a significant amount of real time point data from LiDAR sensors. This results in latency in the processing of the LiDAR data.

BRIEF DESCRIPTION OF THE FIGURES

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Figure 1:
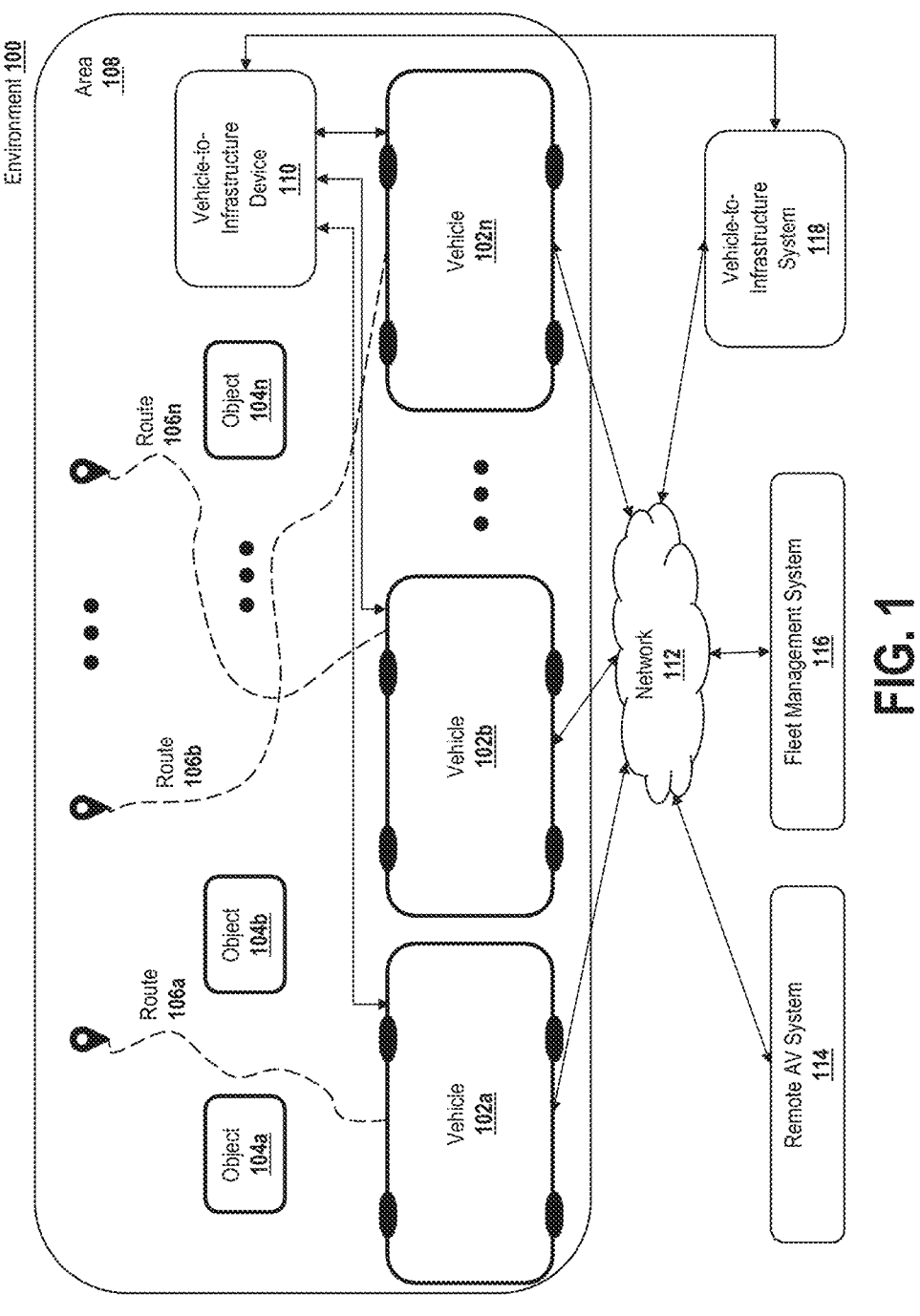
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to A from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, apparatuses described herein include an input interface. The input interface is configured to obtain input sensor data. For example, the input sensor data includes light detection and ranging (LiDAR) data indicative of an environment. The apparatus includes a pre-processor communicatively coupled to the input interface. The pre-processor optionally includes a parser logic. The pre-processor includes a decoder communicatively coupled to the parser logic. The parser logic is configured to parse the input sensor data. The decoder is configured to decode the parsed input sensor data. The pre-processor is configured to provide the decoded input sensor data and the parsed input sensor data to a processor for fusion.

The present disclosure relates to methods and apparatuses that provide a hardware logic for multi-purpose decoding of LiDAR data. The hardware logic provides a customized logic (such as a customized Register Transfer Level, RTL, logic) which increases parallelism for decoding of the LiDAR data. The LiDAR data and/or image data can be collected per sector of the LiDAR (which relates to an azimuth angle of the LiDAR). This allows for sector-wise data collection by the disclosed apparatus. The data collected is pre-processed by the disclosed apparatus in a sector-wise manner and provided to a processor for point merging, and/or point fusion. In other words, in certain embodiments, the apparatus may divide data obtained from a sensor system based on sectors or field-of-views of the sensor from which the data is obtained. For example, if the sensor system (e.g., a LiDAR sensor) has a 360-degree field of view, the apparatus may divide the field of view into four 90-degree sections. The apparatus may associate data obtained by or corresponding to measurements performed by the sensor system within a particular 90-degree section with the section during storage and/or processing (e.g., pre-processing or point merging, etc.) of the data. The hardware logic can include a sector manager and a synchronizer for synchronizing the LiDAR data and the image data.

By virtue of the implementation of systems, methods, and computer program products described herein, techniques for pre-processing of LiDAR data can benefit from an improved latency in the overall processing of the "raw" LiDAR data (e.g., unprocessed LiDAR data). The disclosed apparatus is configured to reduce the latency of processing "raw" sensor data (e.g., data output by the sensors) from multiple sensors (for example LiDAR data with image data), by providing the decoded input sensor data and the parsed input sensor data to a processor for fusion, data integration, or joint analysis. The disclosed apparatus supports sector-wise collection and processing of point cloud or point cloud data. In certain examples, the LiDAR data and the image data are advantageously synchronized by having the LiDAR act as a master or leader for the image sensor, which may act as a slave or follower. The disclosed apparatus provides for a multipurpose decoder and architecture which reduces computing redundancy in processing LiDAR data to be provided to a neural network (for example a semantic network and/or a range view image method (RVIM)), by providing a customized hardware architecture that does not require conversion from polar coordinates to cartesian coordinates back to polar coordinates.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
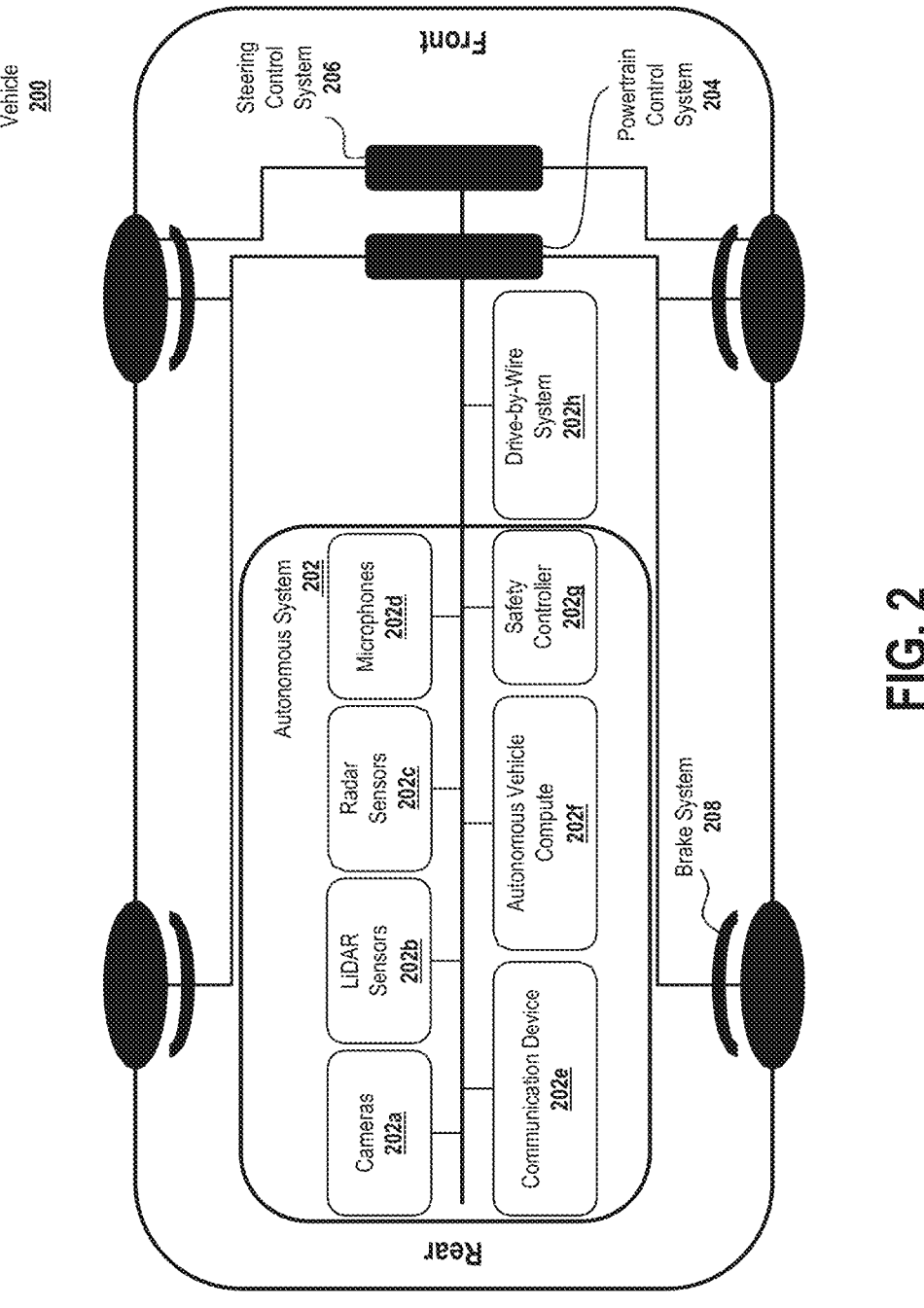
FIG. 2 is a diagram of one or more systems of a vehicle including an autonomous system.

Referring now to FIG. 2, vehicle 200 (which may be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
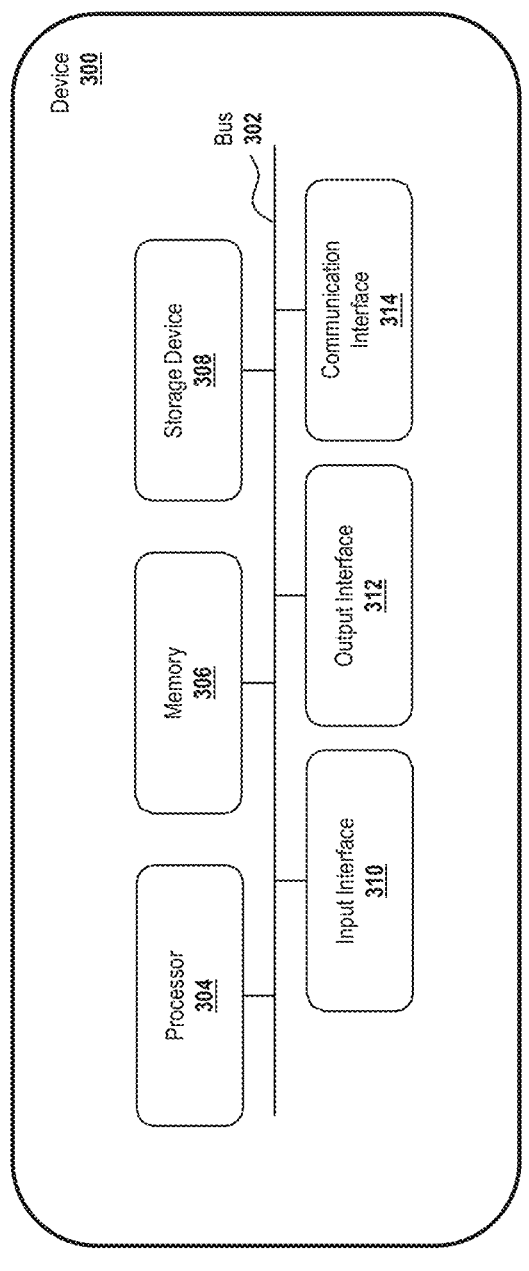
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like)

representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum. In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* includes at least one device configured to be in communication with cameras 202*a*, LiDAR sensors 202*b*, radar sensors 202*c*, microphones 202*d*, autonomous vehicle compute 202*f*, safety controller 202*g*, and/or DBW (Drive-By-Wire) system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like), a server (e.g., a computing device including one or more central processing units, graphical processing units, various Systems-on-Chip (SoCs) and/or the like). In some embodiments, autonomous vehicle compute 202*f* is the same as or similar to autonomous vehicle software and/or hardware 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of FIGS. 1-3, and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
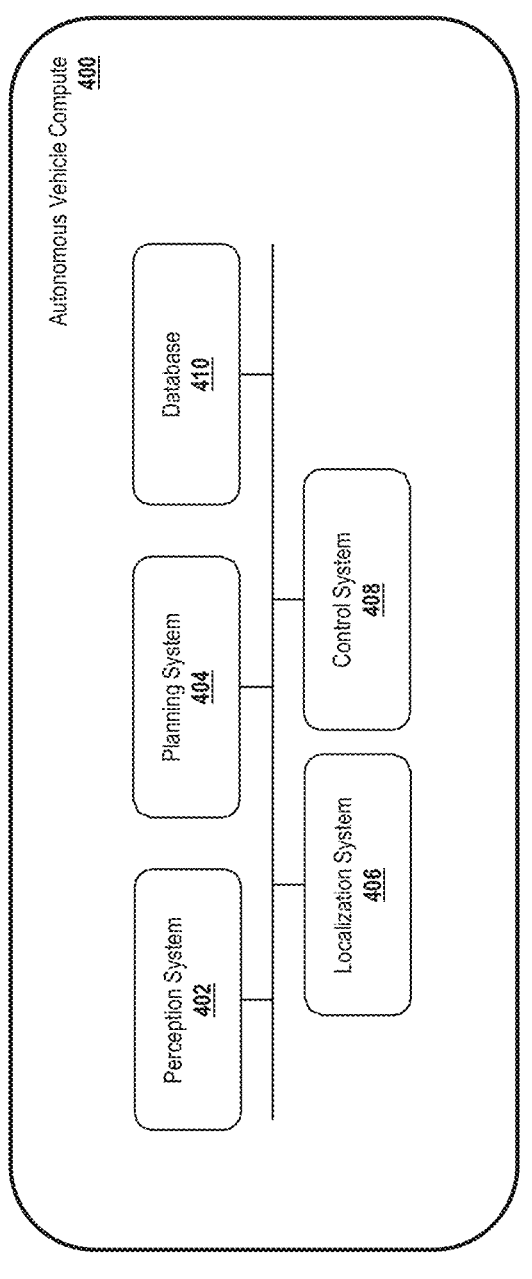
FIG. 4 is a diagram of certain components of an autonomous system.

Referring now to FIG. 4, illustrated is an example block diagram of an autonomous vehicle software 400 (sometimes referred to as an "AV stack"). As illustrated, autonomous vehicle software 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle software 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle software 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle software 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle software 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor. The field of view may refer to an area scanned or otherwise sensed by the LiDAR sensor. The field of view may include a geographic area where light can be emitted by the LiDAR sensor and/or reflected back to the Li DAR sensor. In some cases, the field of view may be determined at a particular period of time, and the field of view may change over time and/or based on movement of the LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
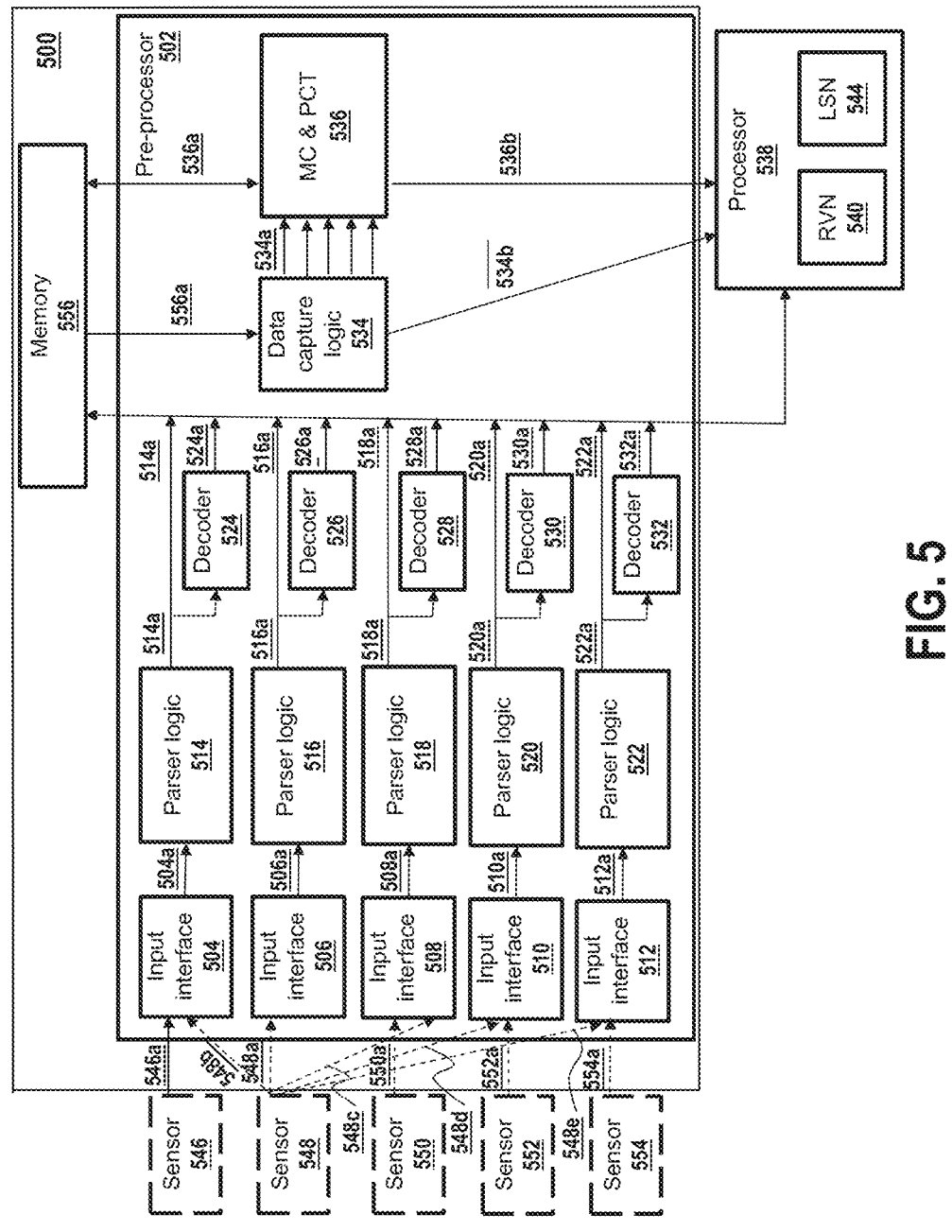
FIG. 5 is a diagram of an example apparatus for pre-processing LiDAR data according to this disclosure.

Referring now to FIG. 5, illustrated is a diagram of an apparatus 500 for pre-processing LiDAR data. In some embodiments, apparatus 500 is or is implemented by a system disclosed herein, e.g., vehicle 200 of FIG. 2, autonomous system 202 of FIG. 2, autonomous vehicle, AV, compute 202*f* of FIG. 2, device 300 of FIG. 3, and/or an AV software 400 of FIG. 4. In one or more examples and embodiments, the apparatus 500 includes an AV compute (such as AV software and/or AV hardware), such as AV compute 202*f* of FIG. 2. In some examples or embodiments, the apparatus 500 is an SoC (e.g., an SoC as described in FIG. 10) or is implemented by an SoC.

In one or more embodiments or examples, the apparatus 500 includes a pre-processor 502, and an input interface 504 communicatively coupled to the pre-processor 502. In some embodiments, the input interface 504 is configured to obtain input sensor data 546*a*. For example, the input sensor data 546*a* includes light detection and ranging (LiDAR) data indicative of an environment. The input interface 504 may include one or more of the embodiments described with respect to the input interface 310. Further, the input interface 504 may include any type of circuit for received sensor data associated with a sensor (e.g., the sensor 546). For example, the input interface may be or may include a data pin, a receiver, an input filter, a multiplexer, or any other input circuitry that can received and/or pre-process (e.g., filter) sensor data received from a sensor. The pre-processor 502 optionally includes a parser logic, e.g., parser logic 514. The parser logic is communicatively coupled to the input interface. The pre-processor 502 includes a decoder, e.g., decoder 524. The decoder is optionally communicatively coupled to the parser logic. The parser logic (e.g., parser logic 514) is configured to parse the input sensor data (e.g., input sensor data 504*a*, which may be the same as or different from input sensor data 546*a*). The decoder (e.g., decoder 524) is configured to decode the parsed input sensor data (e.g., parsed input sensor data 514*a*). The pre-processor 502 is configured to provide the decoded input sensor data (e.g., decoded input sensor data 524*a*) and the parsed input sensor data (e.g., parsed input sensor data 514*a*) to a processor for fusion, e.g., processor 538. The processor 538 can be an AV compute, such as AV software 400 of FIG. 4 or AV compute 202*f* of FIG. 2, or processor 304 of FIG. 3. The term "communicatively coupled" may be used interchangeably with "operatively coupled" and/or "operatively connected" in this application.

In one or more embodiments or examples, the pre-processor 502 includes a plurality of parser logics 514, 516, 518, 520, 522, a plurality of decoders 524, 526, 528, 530, 532, and optionally, a data capture logic 534, and optionally a motion compensation and point cloud transformer, MC & PCT, 536. In one or more embodiments or examples, the pre-processor 502 is communicatively coupled to a plurality of sensors 546, 548, 550, 552, 554, to a memory 556 and to a processor 538.

In one or more embodiments or examples, the input sensor data is indicative of the environment (e.g., the environment of FIG. 1) around the autonomous vehicle, such as for determining trajectories of the autonomous vehicle. In some examples, the input sensor data is indicative of objects, drivable surfaces, non-drivable surfaces, pedestrians, animals, trees, vehicles, or any other type of potential obstacle located in the environment. In one or more embodiments or examples, the input interface 504 is configured to obtain input sensor data 546a. For example, the input interface 504 can be one or more of: an ethernet interface, a bus interface, an optical interface, and a coaxial interface. In one or more embodiments or examples, the input sensor data (e.g., input sensor data 546a) includes light detection and ranging (LiDAR) data indicative of an environment (e.g., the environment of FIG. 1). For example, the input sensor data includes LiDAR data from a LiDAR sensor. In FIG. 5, the LiDAR data is, for example, provided by the LiDAR sensor performing a full sweep, such as a 360 degree sweep of the environment.

In one or more embodiments or examples, the input interface 504 is configured to obtain input sensor data from one or more sensors, such as sensor 546 and/or sensor 548. For example, the input interface is communicatively coupled to the one or more sensors. In one or more embodiments or examples, the one or more sensors are associated with the autonomous vehicle. An autonomous vehicle can include one or more sensors that can be configured to monitor an environment where the autonomous vehicle operates, e.g., via first sensor 546, through first input sensor data 546a. In one or more embodiments or examples, the one or more sensors include first sensor 546, second sensor 548, third sensor 550, fourth sensor 552, and/or fifth sensor 554. For example, the one or more sensors can be one or more of the sensors illustrated in FIG. 2. For example, any one of sensors 546, 548, 550, 552, 554 may be any of the sensors illustrated in FIG. 2. In some embodiments, any one of sensors 546, 548, 550, 552, 554 can be one or more of: a LiDAR sensor, a radar sensor, an image sensor, a microphone, and an infrared sensor. In one or more embodiments or examples, each one of sensors 546, 548, 550, 552, 554 is a LiDAR sensor. In one or more embodiments or examples, sensor 546 is a main or primary LiDAR sensor while each sensor of sensors 548, 550, 552, 554 is an additional or secondary LiDAR sensor. In some embodiments, sensor 546 is a long-range LiDAR sensor while each sensor of sensors 548, 550, 552, 554 is a short-range LiDAR sensor.

Figure 10:
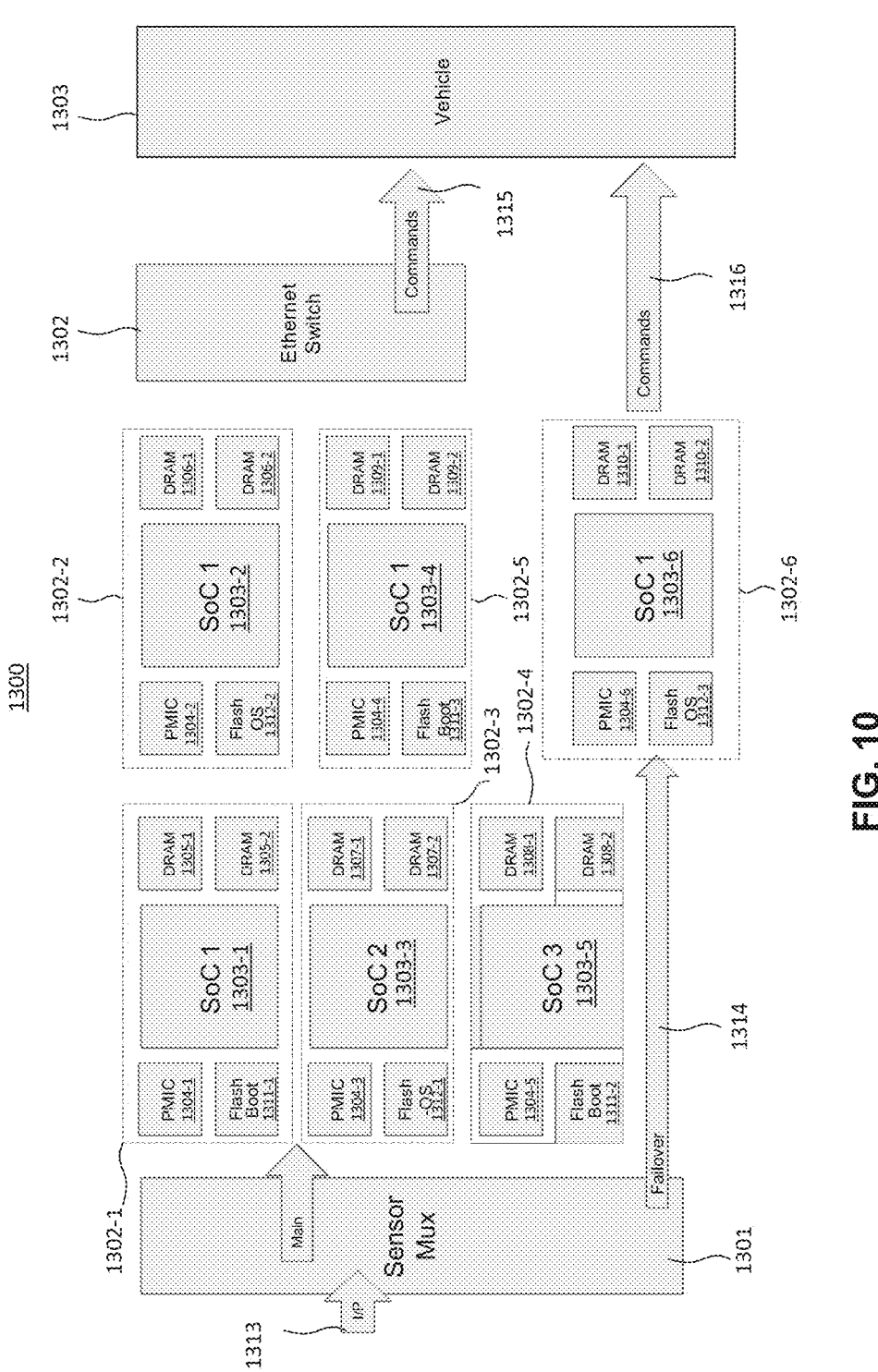
FIG. 10 is a block diagram of an example chip layout of a compute unit for autonomous robotic systems according to this disclosure.

In one or more embodiments, the pre-processor 502 is configured to connect to a processor 538 of an SoC or a chiplet as described in FIG. 10.

In one or more embodiments or examples, the pre-processor 502 includes the parser logic (e.g., parser logic 514, 516, 518, 520, 522) and the decoder (e.g., decoder 524, 526, 528, 530, 532) communicatively coupled to the parser logic. The parser logic may include any circuitry that is configured to parse (e.g., separate, segment, etc.) the input sensor data. For example, the parser logic may include filter circuits that can parse the input sensor data and may filter portions of the input sensor data to, for example, remove noise or identify particular data within the input sensor data. For example, the parser logic may be configured to remove header data from the input sensor data and to provide input sensor data with no header. Further, parsing the input sensor data may include extracting particular data from the input sensor data. For example, parsing the input sensor data may include extracting obstacle data corresponding to obstacles detected by the sensor (e.g., LiDAR) during operation. As another example, the parser logic may be configured to transform the input sensor data obtained in one format (e.g., with an Ethernet header) into input sensor data in another format (e.g., with no Ethernet header). In some cases, the parsed input sensor data includes polar coordinate data obtained from the LiDAR data. The parser logic provides the parsed input sensor data to a processor, e.g., processor 538, and/or to a memory, e.g., memory 556. In one or more embodiments or examples, the parser logic is configured to parse and to form data packet(s) based on the input sensor data. In one or more embodiments or examples, the parser logic includes a data parser configured to obtain and parse the input sensor data from the input interface. In one or more embodiments or examples, the parser logic is configured to provide the parsed input sensor data, optionally as one or more data packets.

The decoder 524 is configured to decode, or transform or convert, the parsed input sensor data 514a. For example, the decoder 524 may convert to transform data from polar coordinates (e.g., points associated with a point cloud that are represented in a polar coordinate grid) to cartesian coordinates and/or vice versa. The decoded input sensor data includes for example cartesian coordinates associated with the LiDAR data. The decoder 524 may provide the decoded input sensor data to a processor, e.g., processor 538, and/or to a memory, e.g., memory 556.

The pre-processor 502 may be configured to provide the decoded input sensor data and the parsed input sensor data to a processor for fusion or at least partial parallel processing. For example, the pre-processor 502 may be configured to provide the decoded input sensor data 524a and the parsed input sensor data 514a to processor 538 for fusion of, for example, LiDAR and image sensor data. For example, the pre-processor 502 is configured to provide in parallel the decoded input sensor data 524a and the parsed input sensor data 514a to processor 538 for fusion. In certain examples where sensor 546 is a LiDAR sensor, the LiDAR sensor may provide LiDAR data based on a full sweep (e.g., a 360 degrees sweep, a full range of motion, or a full field-of-view), to the pre-processor 502. And the pre-processor 502 may provide the decoded input sensor data 524a (e.g., cartesian coordinates) and the parsed input sensor data 514a (e.g., polar coordinates) to processor 538 for fusion, e.g., for a range view image method, RVIM, and bird eye view method, BEVM, respectively. Advantageously, in certain embodiments, by providing both the input sensor data 524a in cartesian coordinates and the parsed sensor data 514a in polar coordinates to the processor 538, the processor 538 is able to perform both the RVIM (or range imaging) and the BEVM at least partially in parallel reducing computing redundancy and latency.

In one or more embodiments or examples, the apparatus 500 includes a plurality of input interfaces 504, 506, 508, 510, 512. Each interface 504, 506, 508, 510, 512 of the plurality of interfaces may be configured to obtain input sensor data 504a, 506a, 508a, 510a, 512a, respectively, from a corresponding sensor 546, 548, 550, 552, 554. For example, each interface may be associated with a sensor. For example, a first input interface, e.g., input interface 504, obtains LiDAR data from a first LiDAR sensor, e.g., sensor 546. For example, a second input interface, e.g., input interface 506, obtains LiDAR data from a second Li DAR sensor, e.g., sensor 548. In some embodiments, a first input interface obtains image data from a first image sensor. In some embodiments, each input sensor data 504a, 506a, 508a, 510a, 512a is configured to generate and/or provide light detection and ranging, LiDAR, data. In one or more embodiments or examples, two sensors, e.g., sensor 546 and 548, are configured to provide input sensor data 546a, 548b into one input interface, e.g., input interface 504. In some embodiments, sensor 548 can provide input sensor data (e.g., input sensor data 548a, 548b, 548c, 548d, 548e) to input interfaces (e.g., input interfaces 504, 506, 508, 510, 512 respectively).

In one or more embodiments or examples, each parser logic of the plurality of parser logics 514, 516, 518, 520, 522, is configured to parse input sensor data 504a, 506a, 508a, 510a, 512a (which may be the same or different, depending on the respective input interface, from input sensor data 546a, 548a, 550a, 552a, 554a), respectively, from the corresponding input interfaces 504, 506, 508, 510, 512. In one or more embodiments or examples, at least one of parser logics 514, 516, 518, 520, 522 is communicatively coupled to at least one of the corresponding input interfaces 504, 506, 508, 510, 512. In one or more embodiments or examples, each parser logic 514, 516, 518, 520, 522 is communicatively coupled to the corresponding input interfaces 504, 506, 508, 510, 512. The data parsing by one parser logic is performed in parallel with at least one other parser logic of the plurality of parser logics. For example, parser logic 514 parses input sensor data 504a in parallel with parser logic 516 that parses input sensor data 506a. For example, parser logic 514 parses input sensor data 504a in parallel with one or more of parser logics 516, 518, 520, 522 that parses input sensor data 506a, 508a, 510a, 512a respectively.

In one or more embodiments or examples, at least one decoder of the plurality of decoders 524, 526, 528, 530, 532 is communicatively coupled to a corresponding parser logic of the plurality of parser logics 514, 516, 518, 520, 522. In one or more embodiments or examples, each decoder of the plurality of decoders 524, 526, 528, 530, 532 is communicatively coupled to a corresponding parser logic of the plurality of parser logics 514, 516, 518, 520, 522. In one or more embodiments or examples, the decoder (e.g., decoder 524, 526, 528, 530, 532) is configured to decode the parsed input sensor data (e.g., parsed input sensor data 514a, 516a, 518a, 520a, 522a, respectively), from the corresponding parser logic (e.g., parser logic 514, 516, 518, 520, 522). In one or more embodiments or examples, the decoding of a parsed input sensor data (e.g., parsed input sensor data 514a) is performed in parallel with at least one other decoding by at least one other decoder of the plurality of decoders (e.g., decoding of parsed input sensor data 516a by decoder 526). For example, the decoding of parsed input sensor data 514a is performed in parallel with at least one other decoding of parsed input sensor data 516a, 518a, 520a and/or 522a. In one or more embodiments or examples, the decoder (e.g., decoder 524, 526, 528, 530, 532) is configured to decode the parsed input sensor data (e.g., parsed input sensor data 514a, 516a, 518a, 520a, 522a, respectively) and provide the decoded input sensor data (e.g., decoded input sensor data 524a, 526a, 528a, 530a, 532a respectively). The decoded input sensor data (e.g., decoded input sensor data 524a, 526a, 528a, 530a, 532a) and the parsed input sensor data (e.g., parsed input sensor data 514a, 516a, 518a, 520a, 522a) are provided by the pre-processor 502 to e.g., the memory 556 and/or to the processor 548. The disclosed hardware logic can increase the parallelism and improve the latency of the "raw" data processing of LiDAR data. Advantageously, this can avoid the apparatus 500 having to make multiple conversions of data. It may be appreciated that in some embodiments, the one or more sensors 546, 548, 550, 552, 554 are LiDAR sensors which provide, as input sensor data, LiDAR data based on a full sweep, e.g., a 360-degree sweep. It may be appreciated that in some embodiments, the LiDAR data from a full sweep is preprocessed in parallel by the pre-processor disclosed herein.

In one or more embodiments or examples, the apparatus 500 includes a memory 556. In one or more embodiments or examples, the pre-processor 502 is configured to store the decoded input sensor data (e.g., one or more of decoded input sensor data 524a, 526a, 528a, 530a, 532a) and the parsed input sensor data (e.g., one or more of parsed input sensor data 514a, 516a, 518a, 520a, 522a) in the memory 556. In one or more embodiments or examples, the pre-processor 502 is configured to store the decoded input sensor data (e.g., one or more of decoded input sensor data 524a, 526a, 528a, 530a, 532a) in a first part of the memory and the parsed input sensor data (e.g., one or more of parsed input sensor data 514a, 516a, 518a, 520a, 522a) in a second part of the memory. In one or more examples, the first part is different from the second part.

In one or more embodiments or examples, the pre-processor 502 includes a data capture logic 534, and optionally a motion compensation and point cloud transformer, MC & PCT, 536. In one or more embodiments or examples, the data capture logic 534 is configured to obtain, from the memory 556, the decoded input sensor data (e.g., one or more of decoded input sensor data 524a, 526a, 528a, 530a, 532a) and the parsed input sensor data (e.g., one or more of parsed input sensor data 514a, 516a, 518a, 520a, 522a). For example, the memory 556 can provide the data capture logic with memory data 556a. For example, the memory data 556a may include the decoded input sensor data (e.g., one or more of decoded input sensor data 524a, 526a, 528a, 530a, 532a) and the parsed input sensor data (e.g., one or more of parsed input sensor data 514a, 516a, 518a, 520a, 522a). In one or more embodiments or examples, the data capture logic 534 is communicatively coupled to the decoder (e.g., one or more of decoders 524, 526, 528, 530, 532). For example, the data capture logic 534 may be a data grabber. In one or more embodiments or examples, the data capture logic is configured to obtain the decoded input sensor data (e.g., one or more of decoded input sensor data 524a, 526a, 528a, 530a, 532a) from the decoder (e.g., one or more of decoders 524, 526, 528, 530, 532 respectively) and the parsed input sensor data (e.g., one or more of parsed input sensor data 514a, 516a, 518a, 520a, 522a) from the parser logic (e.g., the one or more parser logics 514, 516, 518, 520, 522). For example, decoded input sensor data includes cartesian coordinates to be provided to a range view image method, RVIM. For example, the parsed input sensor data includes polar coordinates to be provided to a bird eye view method, BEVM. In one or more embodiments or examples, the data capture logic is configured to store the decoded input sensor data in the first part of the memory 556, and the parsed input sensor data in the second part of the memory 556. For example, the data capture logic 534 provides to the processor 538 data 534b which includes the parsed input sensor data (e.g., one or more of parsed input sensor data 514a, 516a, 518a, 520a, 522a), representing the polar coordinates.

In one or more embodiments or examples, the motion compensation and point cloud transformer (MC & PCT) 536 is configured to obtain the capture logic data 534a from the data capture logic 534, and to provide data 536b to the processor 538. The motion compensation and point cloud transformer MC & PCT 536 is, for example, configured to compensate for the vehicle motion. For example, as an autonomous vehicle is moving, it may be advantageous to fix the latency between the time of obtaining sensor data (e.g., from sensor 546, 568, 550, 552, 554) and the time of computation. The motion compensator can be configured to synchronize longitudinal movement of the autonomous vehicle with that of the obtained data, such as via calculating a timing offset.

The motion compensation and point cloud transformer MC & PCT 536 is for example configured to transform the point cloud. For example, the MC & PCT 536 is configured to increase the density of points in the point cloud, while maintaining accuracy of the point cloud.

For example, the capture logic data 534*a* includes the decoded input sensor data (e.g., one or more of decoded input sensor data 524*a*, 526*a*, 528*a*, 530*a*, 532*a*) and the parsed input sensor data (e.g., one or more of parsed input sensor data 514*a*, 516*a*, 518*a*, 520*a*, 522*a*). For example, data 534*b* includes the parsed input sensor data (e.g., one or more of parsed input sensor data 514*a*, 516*a*, 518*a*, 520*a*, 522*a*), which represents the polar coordinates. For example, data 536*b* includes the result of the motion compensation on the decoded input sensor data (e.g., one or more of decoded input sensor data 524*a*, 526*a*, 528*a*, 530*a*, 532*a*).

In one or more embodiments or examples, the MC and PCT 536 is configured to obtain the memory data 536*a* from the memory 556. For example, the memory data 536*a* includes the decoded input sensor data (e.g., one or more of decoded input sensor data 524*a*, 526*a*, 528*a*, 530*a*, 532*a*) and the parsed input sensor data (e.g., one or more of parsed input sensor data 514*a*, 516*a*, 518*a*, 520*a*, 522*a*). In one or more embodiments or examples, the MC and PCT 536 is configured to provide the memory 556 with the data 536*a*. For example, the data 536*a* is the result of the motion compensation on the decoded input sensor data (e.g., one or more of decoded input sensor data 524*a*, 526*a*, 528*a*, 530*a*, 532*a*).

In one or more embodiments or examples, the processor 538 is configured to process data using a range view image method, RVIM (or RVN 540), and/or a bird eye view method, BEVM (or LSN 544). The RVIM takes, as input, cartesian coordinates provided by the decoded input sensor data (e.g., via data 536*b*). The BEVM takes, as input, polar coordinates provided by the parsed input sensor data (e.g., via data 534*b*).

Figure 6:
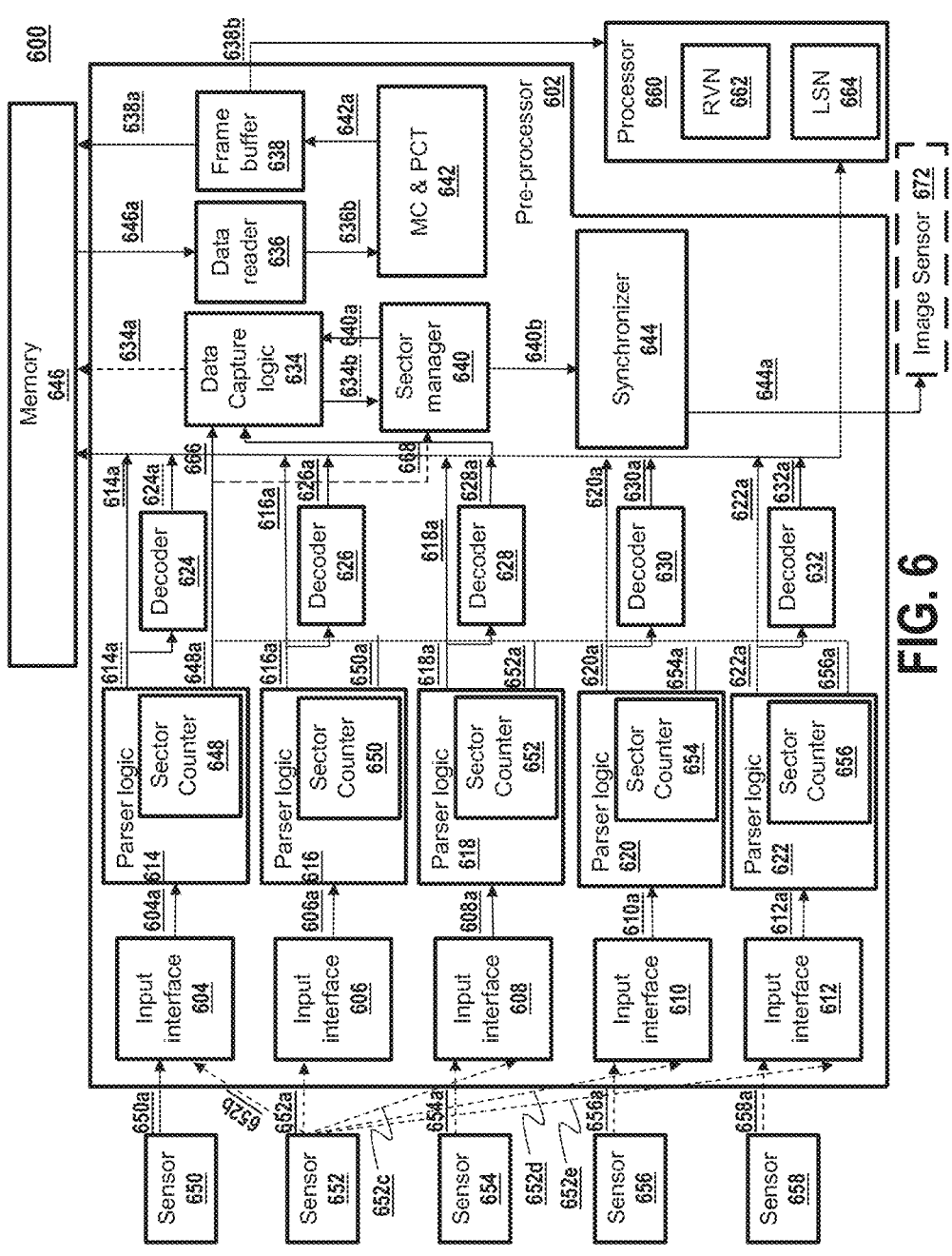
FIG. 6 is a diagram of an example apparatus for pre-processing LiDAR data according to this disclosure.

Referring now to FIG. 6 is a diagram illustrating an apparatus 600 for pre-processing LiDAR data. In some embodiments, apparatus 600 is or includes one or more of the embodiments described with respect to the apparatus 500 of FIG. 5. In some embodiments, apparatus 600 is or is implemented by a system disclosed herein, e.g., vehicle 200 of FIG. 2, autonomous system 202 of FIG. 2, autonomous vehicle, AV, compute 202*f* of FIG. 2, a device 300 of FIG. 3, and/or an AV software 400 of FIG. 4. In some examples or embodiments, the apparatus 600 is an SoC (e.g., an SoC as described in FIG. 10). The apparatus 600 can advantageously provide for sector-wise point cloud data collection in real-time to further optimize latency.

The apparatus 600 includes an input interface 604 and a pre-processor 602, and optionally a memory 646. In one or more embodiments or examples, the pre-processor 602 is or includes one or more of the embodiments described with respect to the pre-processor 502 of FIG. 5. In some embodiments, apparatus 600 includes input interfaces 604, 606, 608, 610, 612 (e.g., the same as or similar to input interfaces of FIG. 5), parser logics 614, 616, 618, 620, 622 (e.g., the same as or similar to parser logics of FIG. 5), decoders 624, 626, 628, 630 and 632 (e.g., the same as or similar to decoders of FIG. 5), data capture logic 634 (e.g., the same as or similar to data capture logic of FIG. 5), motion compensation and point cloud transformer (MC & PCT) 642

(e.g., the same as or similar to motion compensation and point cloud transformer (MC & PCT) of FIG. 5), and/or a processor 660 (e.g., the same as or similar to processor of FIG. 5) including a range view image method, RVIM (or RVN 662) and a bird eye view method, BEVM (or LSN 664) (e.g., the same as or similar to RVIM and BEVM of FIG. 5).

In one or more embodiments or examples, the pre-processor 602 includes a plurality of input interfaces (e.g., input interfaces 604, 606, 608, 610, 612). In one or more embodiments or examples, each of the plurality of input interfaces (e.g., input interfaces 604, 606, 608, 610, 612) is configured to obtain input sensor data (e.g., input sensor data 650*a*, 652*a*, 654*a*, 656*a*, 658*a*) from a corresponding sensor. For example, each of the plurality of input interfaces 604, 606, 608, 610, 612, obtains input sensor data 650*a*, 652*a*, 654*a*, 656*a*, 658*a* from sensor 650, 652, 654, 656, 658 respectively. In one or more embodiments or examples, two sensors, e.g., sensor 650 and 652, are configured to provide input sensor data 650*a*, 652*b*, into one input interface e.g., input interface 604. In some embodiments, sensor 652 can provide input sensor data (e.g., input sensor data 652*a*, 652*b*, 652*c*, 652*d*, 652*e*) to input interfaces (e.g., input interfaces 604, 606, 608, 610 and 612 respectively). For example, each of the plurality of input interfaces 604, 606, 608, 610, 612, outputs input sensor data 604*a*, 606*a*, 608*a*, 610*a*, 612*a* (which may be the same as 650*a*, 652*a*, 654*a*, 656*a*, 658*a*).

Figure 8A:
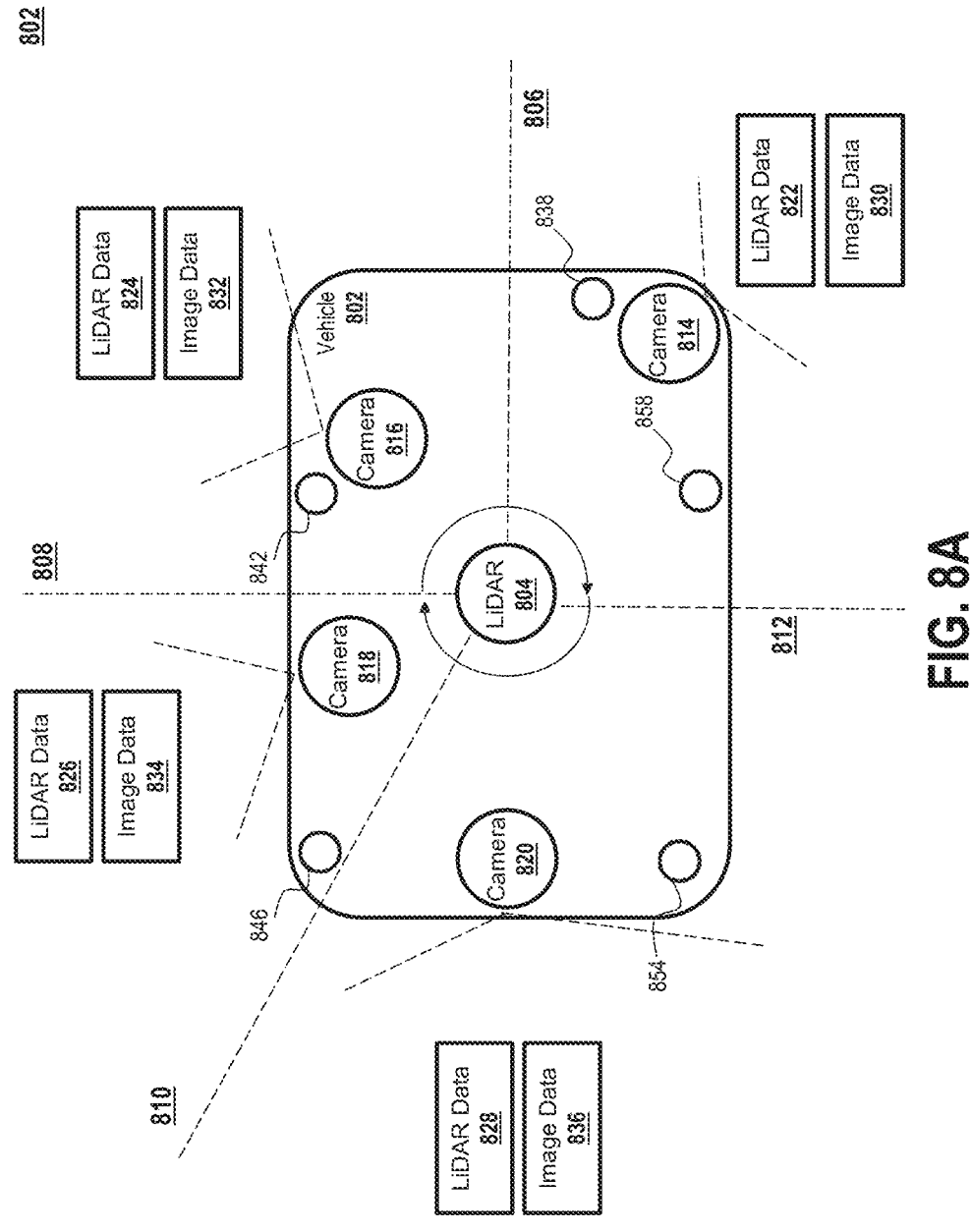
FIGS. 8A-8B are diagrams illustrating sector-wise data collection according to this disclosure.

In one or more embodiments or examples, the input sensor data (e.g., input sensor data 650*a*) includes light detection and ranging (LiDAR) data indicative of an environment (e.g., the environment of FIG. 1). For example, the input sensor data includes LiDAR data from a LiDAR sensor. In FIG. 6, the LiDAR data is for example provided by the LiDAR sensor in a sector-wise manner. In other words, in some embodiments, the LiDAR data may be associated with a particular sector or may be divided into sectors. Each sector may correspond to a particular LiDAR sensor and/or to a particular field-of-view of a LiDAR sensor. In one or more embodiments or examples, the input sensor data comprises the LiDAR data from a LiDAR operating with a field of view. In one or more embodiments or examples, the input interface is configured to obtain a first set of LiDAR data. For example, the first set is associated with a first portion of the field of view, e.g., a first sector of the field of view (as illustrated in FIG. 8A). In other words, for example, the portion is a sector of the field of view. The sector can be seen as a part or a portion of the field of view of the LiDAR, for example, less than 360 degrees. For example, the input sensor data collection is performed sector-wise or per portion of the field of view. In one or more embodiments or examples, the input interface is configured to obtain a second set of the LiDAR data, the second set being associated with a second portion of the field of view. The LiDAR data can include information regarding the portion of the field of view. In other words, the LiDAR data may identify a corresponding field of view associated with the LiDAR data. In one or more embodiments, the input interface can include a first input interface and a second input interface. For example, the first set is obtained via the first input interface while the second set is obtained via the second input interface.

The pre-processor 602 includes a plurality of parser logics 614, 616, 618, 620, 622, a plurality of decoders 624, 626, 628, 630, 632, and optionally, a data capture logic 634, a data reader 636, a frame buffer 638, a sector manager 640, a motion compensation and point cloud transformer (MP & PCT) 642 and a synchronizer 644 (e.g., a camera and LiDAR synchronizer). The pre-processor 602 is communicatively coupled to a processor 660, to one or more sensors (e.g., one or more of sensors 650, 652, 654, 656, 658), and to the memory 646.

In one or more embodiments or examples, each of the plurality of parser logics 614, 616, 618, 620, 622, is configured to parse the input sensor data (e.g., corresponding input sensor data 604a, 606a, 608a, 610a, 612a) respectively, from corresponding input interfaces 604, 606, 608, 610, 612. The data parsing of each parser logic is performed in parallel with at least one other data parsing by another parser logic of the plurality of parser logics.

In one or more embodiments or examples, the parser logic (e.g., parser logic 614, 616, 618, 620, 622) includes a sector counter (e.g., sector counter 648, 650, 652, 654, 656). In one or more embodiments or examples, the sector counter is configured to determine information (e.g., information 648a, 650a, 652a, 654a, 656a) indicative of the portion of the field of view, e.g., sector of the field of view. For example, the information can include angle information, such as azimuth angle of the LiDAR, such as an azimuth counter. The information can be used for associating the LiDAR data with the image sensor data. The information is provided to, e.g., the data capture logic 634, to, e.g., a sector manager 640 to perform the sector-wise data collection and/or to, e.g., the synchronizer 644. For example, the implementation of an azimuth counter inside the parser logic can be used to control the sector wise data collection based on an azimuth value (e.g., the azimuth counter value).

In one or more embodiments or examples, the sensor data further comprises image data from an image sensor, e.g., sensor 672. The image sensor may be a camera or any type of system capable of capturing an image. In some embodiments, there may be a plurality of image sensors or cameras. In one or more embodiments or examples, the pre-processor 602 is configured to synchronize the image data with the LiDAR data. In one or more embodiments or examples, the pre-processor 602 includes a synchronizer 644 configured to synchronize the image data with the LiDAR data.

In one or more embodiments or examples, the pre-processor 602 is configured to synchronize the image data with the LiDAR data by activating, according to the information (e.g., information 648a, 650a, 652a, 654a, and 656a), the image sensor (e.g., sensor 672) to obtain the image data. For example, the synchronizer 644 activates, according to the information, the image sensor 672 via signal 644a to obtain the image data. For example, the LiDAR sensor acts as a master (or primary system) for determining the timing during which to collect sensor data for a particular sensor thereby enabling synchronization between sensors. In some embodiments, LiDAR is an advantageous candidate for acting as a timing master or primary system to perform sector synchronization between LiDAR and camera data due, for example, to the continual rotation around a field of view of the LiDAR. Further, it may be easier for the LiDAR system to provide changes in rotation speeds and/or operation to a camera system or image sensors than for the camera system to detect changes in LiDAR rotation.

In some embodiments, the synchronizer 644 may activate a particular image sensor 672 of a plurality of image sensors based on a sector of the LiDAR sensor (e.g., based on a direction the LiDAR sensor is facing). Thus, the synchronizer 644 may synchronize the LiDAR sensor with an image sensor 672. Alternatively, the plurality of image sensors may each be active, but the synchronizer 644 may synchronize a particular image sensor with the LiDAR sensor based at least in part on the direction of the LiDAR sensor during a sweep where the LiDAR sensor rotates a particular number of degrees (e.g., 360 degrees). Synchronizing the Li DAR sensor with the image sensor may include synchronizing data captured by the LiDAR sensor with data captured by the image sensor. In some cases, a sector manager 640 may divide a field of view of a LiDAR sensor (e.g., a long-range LiDAR sensor) into sectors. In some such cases, the synchronizer 644 may synchronize the image sensors with a corresponding sector of the LiDAR sensor. By synchronizing the LiDAR sensor sectors with the image sensors, and by parallel processing the data obtained from the LiDAR sensor with the data obtained from the image sensors, latency can be decreased, and parallel processing can be increased. Further, by synchronizing the LiDAR sensor with the image processors using the synchronizer 644, the system can be adaptive in that when the speed of rotation of the LiDAR sensor is adjusted, the synchronizer may maintain synchronization with the image sensors and automatically adjust the exposure timing of the image sensor to maintain the synchronization with the LiDAR sensor. In some embodiments, the synchronizer 644 may maintain synchronization based on the azimuth value.

In one or more embodiments or examples, each of the plurality of decoders 624, 626, 628, 630, 632 is communicatively coupled to a corresponding parser logic of the plurality of parser logics. In one or more embodiments or examples, each of the plurality of decoders 624, 626, 628, 630, 632 is configured to decode the parsed input sensor data 614a, 616a, 618a, 620a 622a, respectively. The decoding of each parsed input sensor data 614a, 616a, 618a, 620a may be performed in parallel with at least one other decoding by one other decoder of the plurality of decoders. In one or more embodiments or examples, the decoded input sensor data 624a, 626a, 628a, 630a, 632a, and the parsed input sensor data 614a, 616a, 618a, 620a, 622a are provided by the pre-processor 602 to the memory 646.

In one or more embodiments or examples, the data capture logic 634 is configured to obtain the decoded input sensor data 624a, 626a, 628a, 630a, 632a from the plurality of decoders, the parsed input sensor data 614a, 616a, 618a, 620a, 622a from the plurality of parser logics and the information 648a, 650a, 652a, 654a, 656a determined by the corresponding select counter 648, 650, 652, 654, 656. In one or more embodiments or examples, the data capture logic 634 is configured to store the decoded input sensor data 624a, 626a, 628a, 630a, 632a in the first part of the memory 646, and the parsed input sensor data 614a, 616a, 618a, 620a, 622a in the second part of the memory 646. In one or more embodiments or examples, the sector manager 640 obtains, from the data capture logic, data 634b including the decoded input sensor data and the parsed input sensor data associated with the information regarding the portion of the field of view.

In one or more embodiments or examples, the pre-processor 602 includes a sector manager 640 configured to obtain the information (e.g., information 648a, 650a, 652a, 654a, 656a) from the sector counter(s) and perform the sector-wise data collection from the memory 646, optionally via the data capture logic 634.

In one or more embodiments or examples, the sector manager 640 is configured to obtain the information 648a, 650a, 652a, 654a, 656a provided by the corresponding plurality of sector counters 648, 650, 652, 654, 656, and perform a sector-wise data collection from the data capture logic 634. In one or more embodiments or examples, the information 648a, 650a, 652a, 654a, 656a is obtained by the sector manager 640 in the form of data 668. In one or more embodiments or examples, the information 648*a*, 650*a*, 652*a*, 654*a*, 656*a* is obtained by the data capture logic 634 in the form of data 666.

In one or more embodiments or examples, a synchronizer 644 is configured to synchronize the input sensor data further including image data, from an image sensor (e.g., image sensor 672), with the input sensor data including the LiDAR data, using the information 648*a*, 650*a*, 652*a*, 654*a*, 656*a*. In one or more embodiments or examples, the synchronizer provides the image sensor 672 with a triggering signal 644*a*.

In one or more embodiments or examples, the pre-processor 602 stores the decoded input sensor data 624*a*, 626*a*, 628*a*, 630*a*, 632*a* and the parsed input sensor data 614*a*, 616*a*, 618*a*, 620*a*, 622*a* in the memory 646, e.g., in a first part of the memory 646 and a second part of the memory 646.

In one or more embodiments or examples, the data reader 636 obtains data 646*a* from the memory 646. In one or more embodiments or examples, the data 646*a* includes the decoded input sensor data 624*a*, 626*a*, 628*a*, 630*a*, 632*a* and/or the parsed input sensor data 614*a*, 616*a*, 618*a*, 620*a*, 622*a*.

In one or more embodiments or examples, the MC & PCT 642 obtains, from the data reader 636, the decoded input sensor data 624*a*, 626*a*, 628*a*, 630*a*, 632*a* and/or the parsed input sensor data 614*a*, 616*a*, 618*a*, 620*a*, 622*a* as part of data 636*b*. In one or more embodiments or examples, the MC & PCT 642 is configured to process data 636*b* for compensating the autonomous vehicle's motion and to provide the frame buffer 638 with the result of the compensation, such as from data 642*a*, and optionally the information. For example, the MC & PCT 642 may store multiple frames, and can transfer processed frames to the frame buffer 638. In one or more embodiments or examples, the decoded input sensor data 624*a*, 626*a*, 628*a*, 630*a*, 632*a* include cartesian coordinates. In one or more embodiments or examples, the parsed input sensor data 614*a*, 616*a*, 618*a*, 620*a*, 622*a* include polar coordinates.

In one or more embodiments or examples, the frame buffer 638 provides or sends data 638*a* to the memory 646 and/or data 638*b* to the processor 660. The data 638*a* and data 638*b* may be provided in frames.

Figure 7:
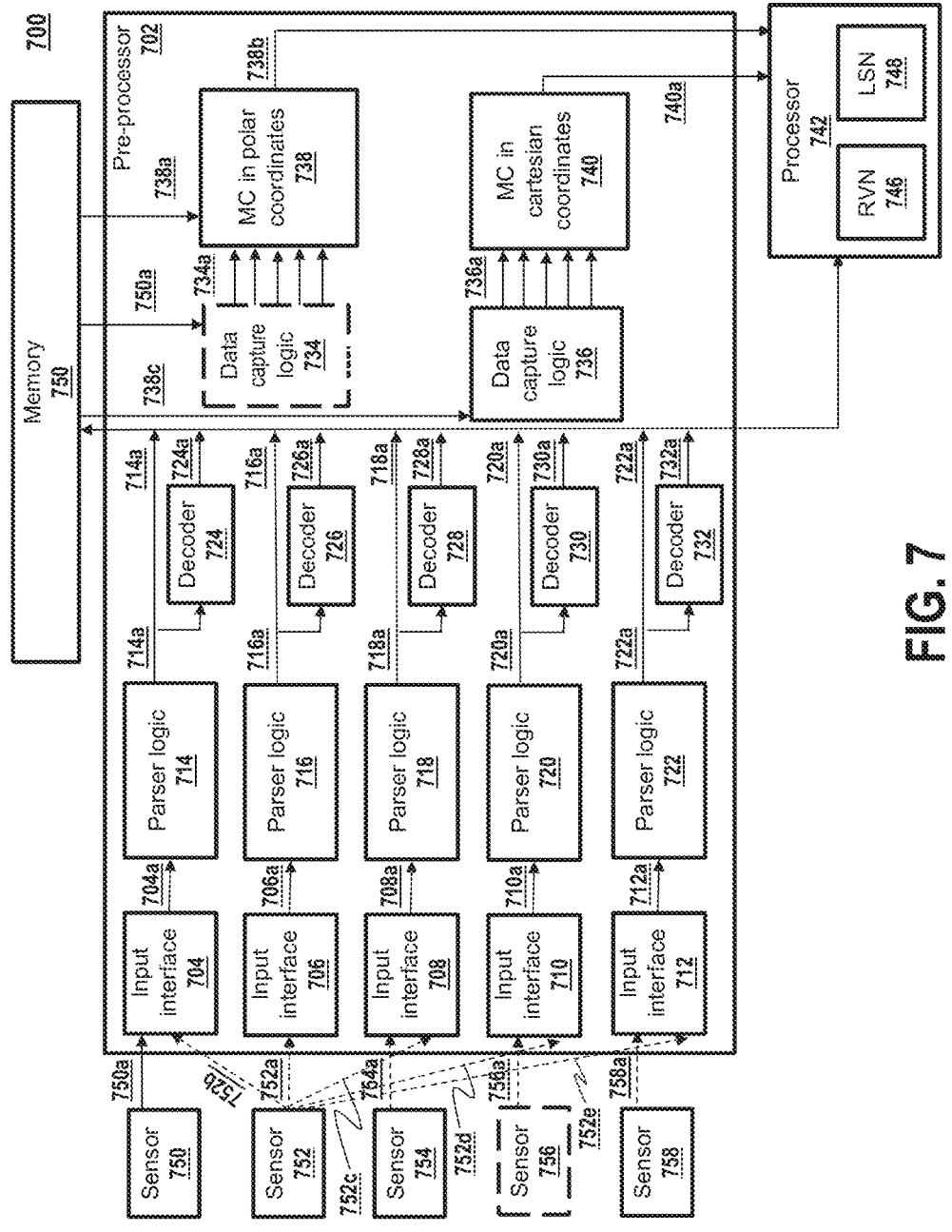
FIG. 7 is a diagram of an example apparatus for pre-processing LiDAR data according to this disclosure.

Referring now to FIG. 7, illustrated is a diagram of an apparatus 700 for pre-processing LiDAR data. In some embodiments, apparatus 700 is the same as or includes one or more of the embodiments described with respect to apparatus 500 of FIG. 5 and/or apparatus 600 of FIG. 6. In some embodiments, apparatus 600 is or is implemented by a system disclosed herein, e.g., vehicle 200 of FIG. 2, autonomous system 202 of FIG. 2, autonomous vehicle, AV, compute 202*f* of FIG. 2, a device 300 of FIG. 3, and/or an AV software 400 of FIG. 4.

In some embodiments, the apparatus 700 includes one or more sensors 750, 752, 754, 756, 758, a pre-processor 702, one or more input interfaces 704, 706, 708, 710, 712, one or more parser logics 714, 716, 718, 720 and 722, one or more decoders 724, 726, 728, 730, 732, data capture logics 734, 736, a Motion Compensation, MC, 738 for polar coordinates, a Motion Compensation, MC, 740 for cartesian coordinates, a memory 750, and/or a processor 742 including a range view image method(RVIM or RVN 746), and/or a bird eye view method (BEVM or LSN 748). Some of these components are similarly integrated in the apparatus 500 of FIGS. 5 and/or 600 of FIG. 6, such as the plurality of sensors (such as the sensors of FIG. 5 and/or of FIG. 6), the preprocessor (such as the pre-processor of FIG. 5 and/or of FIG. 6), the input interfaces (such as the input interfaces of FIG. 5 and/or of FIG. 6), the parser logics (such as the parser logics of FIG. 5 and/or of FIG. 6), the decoders (such as the decoders of FIG. 5 and/or of FIG. 6), the memory (such as the memory of FIG. 5 and/or of FIG. 6), the data capture logics (such as the data capture logic of FIG. 5 and/or of FIG. 6) and the processor (such as the processor of FIG. 5 and/or of FIG. 6). Apparatus 600 may be seen as an example integrating the Motion Compensation (MC) 738 for polar coordinates, and the Motion Compensation (MC) 740 for cartesian coordinates.

In one or more embodiments or examples, the pre-processor 702 includes a plurality of input interfaces 704, 706, 708, 710, 712, which are configured to obtain input sensor data 750*a*, 752*a*, 752*b*, 752*c*, 752*d*, 752*e*, 754*a*, 756*a*, 758*a*, respectively, from corresponding sensors 750, 752, 754, 756, 758. The input sensor data 750*a*, 752*a*, 752*b*, 752*c*, 752*d*, 752*e*, 754*a* 756*a*, 758*a* comprises light detection and ranging, LiDAR, data. The acquisition of the input sensor data by the input interfaces may not be necessarily directional. In one or more embodiments or examples, the sensor (such as the sensor 752) can provide the input interfaces 704, 706, 708, 710, 712 with input sensor data 752*a*, 752*b*, 752*c*, 752*d*, 752*e*. In one or more embodiments or examples, the sensor (such as the sensor 750) can provide the input interface 704 with input sensor data 750*a*.

In one or more embodiments or examples, the pre-processor 702 includes a plurality of parser logics 714, 716, 718, 720, 722, a plurality of decoders 724, 726, 728, 730, 732, and optionally, data capture logics 734, 736 and a MC for polar and cartesian coordinates. In one or more embodiments or examples, the pre-processor 702 is communicatively coupled to the plurality of one or more sensors 750, 752, 754, 756, 758 and/or to the memory 750 and/or to the processor 742.

In one or more embodiments or examples, the plurality of parser logics 714, 716, 718, 720, 722, is configured to parse input sensor data 704*a*, 706*a*, 708*a*, 710*a*, 712*a*, respectively, from the corresponding input interfaces 704, 706, 708, 710, 712. In one or more embodiments or examples, the input sensor data 704*a*, 706*a*, 708*a*, 710*a*, 712*a* may be the same as or based on the input sensor data 750*a*, 752*a*, 752*b*, 752*c*, 752*d*, 752*e*, 754*a* 756*a*, 758*a*. In one or more embodiments or examples, the data parsing of each parser logic is performed in parallel with at least one other parser logic of the plurality of parser logics.

In one or more embodiments or examples, the plurality of decoders 724, 726, 728, 730, 732 is configured to decode the parsed input sensor data 714*a*, 716*a*, 718*a*, 720*a*, 722*a*, respectively, from the corresponding parser logics 714, 716, 718, 720 and 722. The decoding of each parsed input sensor data 714*a*, 716*a*, 718*a*, 720*a*, 722*a* is performed in parallel with at least one other decoder of the plurality of decoders. In one or more embodiments or examples, the decoded input sensor data 724*a*, 726*a*, 728*a*, 730*a*, 732*a* and the parsed input sensor data 714*a*, 716*a*, 718*a*, 720*a*, 722*a* are provided by the pre-processor 702 to the memory 750.

In one or more embodiments or examples, the data capture logic 734 is configured to obtain, from the memory 750, the decoded input sensor data 724*a*, 726*a*, 728*a*, 730*a*, 732*a* and the parsed input sensor data 714*a*, 716*a*, 718*a*, 720*a*, 722*a*. In one or more embodiments or examples, the memory 750 provides the data capture logic with memory data 750*a*. In one or more embodiments or examples, the memory data 750*a* includes the decoded input sensor data 724*a*, 726*a*, 728*a*, 730*a*, 732*a* and the parsed input sensor data 714*a*, 716*a*, 718*a*, 720*a*, 722*a*.

In one or more embodiments or examples, the MC 738 is configured to obtain the data 734*a* from the data capture logic 734, and to provide the processor 742 with the decoded input sensor data 724*a*, 726*a*, 728*a*, 730*a*, 732*a*. In one or more embodiments or examples, the MC 738 is configured to obtain data 738*a* from memory 750. In one or more embodiments or examples, the motion compensation, MC, 738 provides the RVN 746 integrated in the processor 742, with the decoded input sensor data 724*a*, 726*a*, 728*a*, 730*a*, 732*a*. In one or more embodiments or examples, the decoded input sensor data 724*a*, 726*a*, 728*a*, 730*a*, 732*a* include cartesian coordinates. In one or more embodiments or examples, the decoded input sensor data 724*a*, 726*a*, 728*a*, 730*a*, 732*a* is obtained by the processor 742 via data 738*b*.

In one or more embodiments or examples, the MC 740 is configured to obtain the capture logic data 736*a* from the data capture logic 736, and to provide the LSN 748 integrated in the processor 742, with the parsed input sensor data 714*a*, 716*a*, 718*a*, 720*a*, 722*a*. In one or more embodiments or examples, the parsed input sensor data 714*a*, 716*a*, 718*a*, 720*a*, 722*a* include polar coordinates. In one or more embodiments or examples, the parsed input sensor data 714*a*, 716*a*, 718*a*, 720*a*, 722*a* is obtained by the processor 742 via data 740*a*. In one or more embodiments or examples, the decoded input sensor data 724*a*, 726*a*, 728*a*, 730*a*, 732*a* can be provided to the data capture logic 736 by the memory 750 via data 738*c*.

The apparatus 500, 600, 700, can be implemented as a system on a chip, SoC, for processing input sensor data. The apparatus 500, 600, 700, can be part of the system on a chip, SoC, for processing input sensor data provided in FIG. 10.

FIG. 8A shows a vehicle 802 including a long-range LiDAR 804, short-range LiDARs 838, 842, 846, 854, 858, cameras 814, 816, 818, 820, and portions of the field of view of the long-range LiDAR (e.g., LiDAR sectors) 806, 808, 810 and 812. For each portion of the field of view, LiDAR data 822, 824, 826, 828, and image data 830, 832, 834, 836 is collected.

Figure 8B:
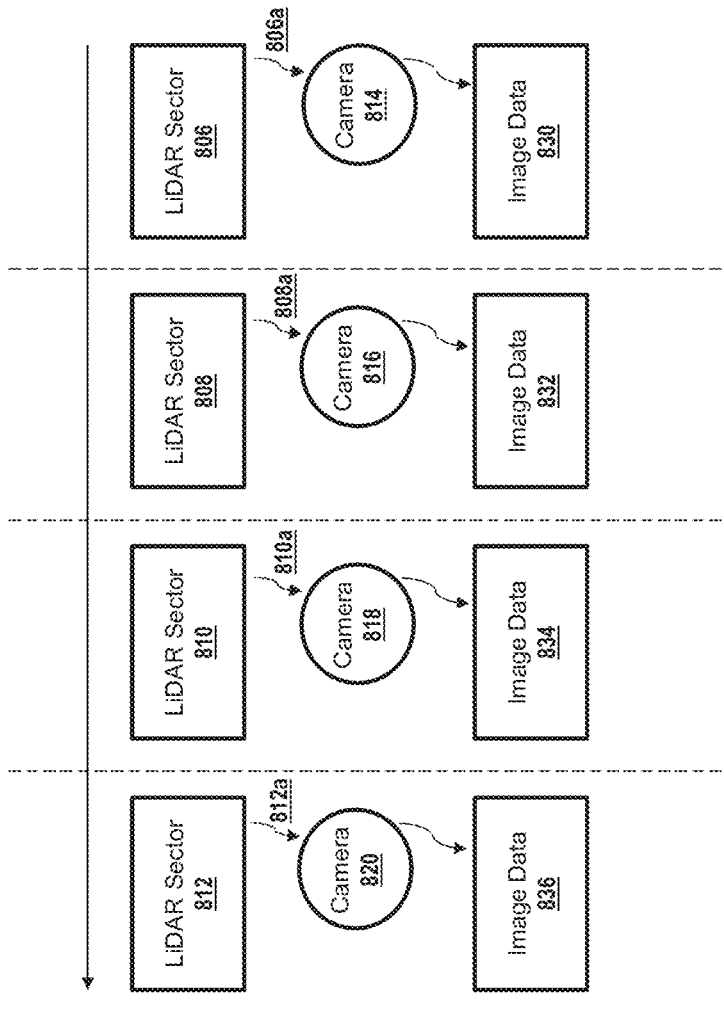

FIG. 8B shows portions of the field of view of the long-range LiDAR (e.g., LiDAR sectors) 806, 808, 810, 812, the cameras 814, 816, 818, 820, and the image data 830, 832, 834, 836. In one or more embodiments or examples, a sector manager (e.g., the sector manager 640) is configured to perform a sector-wise data collection, based on information (e.g., the information 648*a*, 650*a*, 652*a*, 654*a*, 656*a* of FIG. 6) provided by a respective sector counter (e.g., the sector counters 648, 650, 652, 654, 656 of FIG. 6). In one or more embodiments or examples, the information is obtained from a data capture logic (e.g., the data capture logic 534 of FIG. 5, the data capture logic 634 of FIG. 6, or the data capture logic 734 of FIG. 7) and/or from the sector counter included in a parser logic. In one or more embodiments or examples, a synchronizer is configured to synchronize an image data (e.g., the image data 830, 832, 834, 836 of FIGS. 8A-8B) with the LiDAR data (e.g., the LiDAR data 822, 824, 826, 828 of FIG. 8A) by activating, according to the information provided by the sector counter, an image sensor to obtain the image data (e.g., the image data 830, 832, 834 and 836 of FIG. 8B). In other words, the synchronization of the image data with the LiDAR data is performed by activating, based on the information provided by the sector counter, the LiDAR sector (e.g., the LiDAR sectors 806, 808, 810, 812) that, by providing triggering information 806*a*, 808*a*, 810*a*, 812*a*, causes a camera to initiate the collection of image data 830, 832, 834, 836.

Figure 9:
FIG. 9 is a flowchart of a process for pre-processing LiDAR data according to this disclosure.
Figure 9:
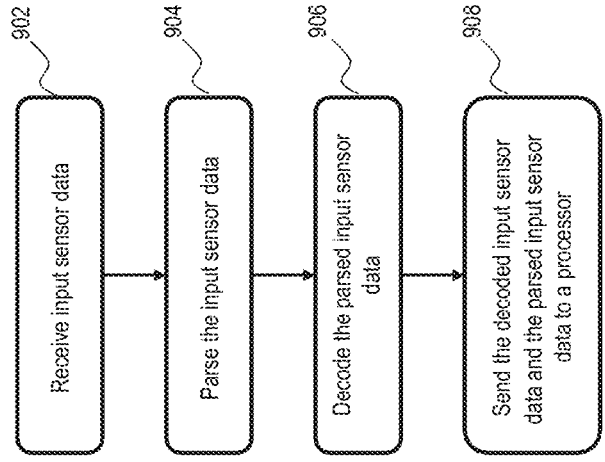

Referring now to FIG. 9, illustrated is a flowchart of a process 900 for pre-processing LiDAR data. In some embodiments, one or more of the operations described with respect to the process or method 900 are performed (e.g., completely, partially, and/or the like) by apparatus 500 of FIG. 5, apparatus 600 of FIG. 6, and/or apparatus 700 of FIG. 7. Additionally, or alternatively, in some embodiments one or more operations described with respect to the process 900 are performed (e.g., completely, partially, and/or the like) by another device or group of devices separate from or including apparatus 500 of FIG. 5, apparatus 600 of FIG. 6, and/or apparatus 700 of FIG. 7.

In one or more examples, the process 900 includes receiving, at block 902, by a pre-processor, input sensor data. In one or more examples, the input sensor data includes light detection and ranging (LiDAR) data. In one or more examples, the process 900 includes parsing, at block 904, by the pre-processor, the input sensor data. In one or more examples, the process 900 includes decoding, at block 906, by the pre-processor, the parsed input sensor data. In one or more examples, the process 900 includes sending, at block 908, by the pre-processor, the decoded input sensor data and the parsed input sensor data to a processor.

In one or more examples, receiving, at block 902, by a pre-processor, input sensor data includes receiving input sensor data from a corresponding sensor. Each interface is associated with a sensor. For example, a first input interface obtains LiDAR data from a first LiDAR. For example, a second input interface obtains LiDAR data from a second LiDAR. For example, a first interface obtains image data from a first image sensor. In one or more examples, two sensors feed data into one input interface. In one or more examples, parsing, at block 904, by the pre-processor, the input sensor data includes parsing a part of the input sensor data in parallel with at least one other part of the input sensor data. In one or more examples, decoding, at block 906, by the pre-processor, the parsed input sensor data includes decoding a part of the parsed input sensor data in parallel with at least one other part of the parsed input sensor data.

In one or more examples, the input sensor data includes the LiDAR data from a LiDAR operating with a field of view. In one or more examples, receiving, at block 902, by the pre-processor, the input sensor includes receiving, by the pre-processor, a first set of the LiDAR data. In one or more examples, the first set is associated with a first portion of the field of view.

In one or more examples, receiving, at block 902, by the pre-processor, the input sensor includes receiving, by the pre-processor, a second set of LiDAR data. In one or more examples, the second set is associated with a second portion of the field of view.

In one or more examples, the process 900 includes determining information indicative of the portion. For example, the information can be angle information, such as an azimuth angle of the LiDAR or an azimuth counter. The information can be used for associating the LiDAR data with the sensor data.

In one or more examples, the sensor data further includes image data from an image sensor. In one or more examples, the process 900 includes synchronizing the image data with the LiDAR data.

In one or more examples, synchronizing the image data with the LiDAR data includes activating, according to the information, the image sensor to obtain the image data. For example, the LiDAR acts as a master for the timing to collect the sector wise input sensor data with synchronization.

In one or more examples, the process 900 includes storing the decoded input sensor data in a first part of a memory and the parsed input sensor data in a second part of the memory.

In one or more examples, the second part of the memory is different from the first part of the memory.

In one or more examples, the process 900 includes providing the parsed input sensor data, optionally in one or more data packets.

FIG. 10 is a block diagram of a chip layout of a compute unit 1300 for autonomous robotic systems, in accordance with one or more embodiments. Compute unit 1300 can be implemented in, for example, an AV compute (e.g., AV compute 202*f*). Compute unit 1300 includes sensor multiplexer (Mux) 1301, main compute clusters 1302-1 through 1302-5, failover compute cluster 1302-6 and Ethernet switch 1302. Ethernet switch 1302 includes a plurality of Ethernet transceivers for sending commands 1315 to vehicle 1303, where the commands 1315 are received by one or more of DBW system 202*h*, safety controller 202*g*, brake system 208, powertrain control system 204 and/or steering control system 206, as shown in FIG. 2.

A first main compute cluster 1302-1 includes SoC 1303-1, volatile memory 1305-1, 1305-2, power management integrated circuit (PMIC) 1304-1 and flash boot 1311-1. A second main compute cluster 1302-2 includes SoC 1303-2, volatile memory 1306-1, 1306-2 (e.g., DRAM), PMIC 1304-2 and flash Operating System (OS) 1312-2. A third main compute cluster 1302-3 includes SoC 1303-3, volatile memory 1307-1, 1307-2, PMIC 1304-3 and flash OS memory 1312-1. A fourth main compute cluster 1302-4 includes SoC 1303-5, volatile memory 1308-1, 1308-2, PMIC 1304-5 and flash boot memory 1311-2. A fifth main compute cluster 1302-4 includes SoC 1303-4, volatile memory 1309-1, 1309-2, PMIC 1304-4 and flash boot memory 1311-3. Failover compute cluster 1302-6 includes SoC 1303-6, volatile memory 1310-1, 1310-2, PMIC 1304-6 and flash OS memory 1312-3.

Each of the SoCs 1303-1 through 1303-6 can be a multiprocessor SoC (MPSoC). Each of the SoCs can act as, or be composed of, any one of the pre-processors 502, 602, 702 and/or processors 538, 660, 742 discussed above with respect to FIGS. 5-7 above.

In some embodiments, the PMICs 1304-1 through 1304-6 monitor relevant signals on a bus (e.g., a PCIe bus), and communicate with a corresponding memory controller (e.g., memory controller in a DRAM chip) to notify the memory controller of a power mode change, such as a change from a normal mode to a low power mode or a change from the low power mode to the normal mode. In an embodiment, PMICs 1304-1 through 1304-6 also receive communication signals from their respective memory controllers that are monitoring the bus, and perform operations to prepare the memory for lower power mode. When a memory chip is ready to enter low power mode, the memory controller communicates with its respective slave PMIC to instruct the slave PMIC to initiate the lower power mode.

In some embodiments, sensor mux 1301 receives and multiplexes sensor data (e.g., video data, LiDAR point clouds, RADAR data) from a sensor bus through a sensor interface 1313, which in some embodiments is a low voltage differential signaling (LVDS) interface. In an embodiment, sensor mux 1301 steers a copy of the video data channels (e.g., Mobile Industry Processor Interface (MIPI®) camera serial interface (CSI) channels), which are sent to failover cluster 1302-6. Failover cluster 1302-6 provides backup to the main compute clusters using video data to operate the AV, when one or more main compute clusters 1302-1 fail.

Compute unit 1300 is one example of a high-performance compute unit for autonomous robotic systems, such as AV computes, and other embodiments can include more or fewer clusters, and each cluster can have more or fewer SoCs, volatile memory chips, non-volatile memory chips, NPUs, GPUs, and Ethernet switches/transceivers.

Disclosed are non-transitory computer readable media comprising instructions stored thereon that, when executed by at least one processor, cause the at least one processor to carry out operations according to one or more of the methods disclosed herein.

Also disclosed are methods, non-transitory computer readable media, and systems according to any of the following clauses:

Clause 1. An apparatus comprising:
an input interface configured to receive sensor data from a sensor, wherein the sensor comprises a light detection and ranging (LiDAR) sensor and wherein the sensor data comprises LiDAR data associated with an environment scanned by the LiDAR sensor; and
a pre-processor communicatively coupled to the input interface,
wherein the pre-processor comprises parser logic and a decoder communicatively coupled to the parser logic,
wherein the parser logic is configured to parse the sensor data to obtain parsed sensor data,
wherein the decoder is configured to decode the parsed sensor data to obtain decoded sensor data, and
wherein the pre-processor is configured to provide the decoded sensor data and the parsed sensor data to a processor configured to perform range imaging and a bird eye view imaging based at least in part on at least one of the decoded sensor data or the parsed sensor data.

Clause 2. The apparatus of clause 1, wherein the decoder is configured to decode the parsed sensor data by converting the parsed sensor data from a first coordinate space to a second coordinate space, and wherein the decoded sensor data is in the second coordinate space.

Clause 3. The apparatus of clause 2, wherein providing the decoded sensor data and the parsed sensor data to the processor causes the processor to process the sensor data in the first coordinate space and the second coordinate space at least partially in parallel.

Clause 4. The apparatus of any one of the preceding clauses, wherein the input interface is one of a plurality of input interfaces of the apparatus, wherein each input interface of the plurality of input interfaces is configured to obtain input sensor data from a corresponding sensor of a plurality of sensors, and wherein the pre-processor comprises:
a plurality of parser logics, wherein each parser logic of the plurality of parser logics is communicatively coupled to a corresponding input interface of the plurality of input interfaces, wherein each parser logic is configured to parse the sensor data from the corresponding input interface in parallel with at least one other parser logic of the plurality of parser logics; and
a plurality of decoders, wherein each decoder of the plurality of decoders is communicatively coupled to a corresponding parser logic of the plurality of parser logics, wherein each decoder is configured to decode the parsed sensor data from the corresponding parser logic in parallel with at least one other decoder of the plurality of decoders.

Clause 5. The apparatus of clause 4, wherein at least one of the plurality of sensors is an image sensor.

Clause 6. The apparatus of any one of the preceding clauses, wherein the LiDAR sensor operates within a field of view of the environment, and wherein the LiDAR data comprises a first set of LiDAR data associated with a first portion of the field of view.

Clause 7. The apparatus of clause 6, wherein the input interface is configured to obtain a second set of LiDAR data associated with a second portion of the field of view.

Clause 8. The apparatus of any one of clauses 6-7, wherein the parser logic comprises a sector counter configured to determine information indicative of the first portion of the field of view.

Clause 9. The apparatus of clause 8, wherein the sensor data further comprises image data from an image sensor, wherein the pre-processor is configured to synchronize the image data with the LiDAR data.

Clause 10. The apparatus of clause 9, wherein the pre-processor is configured to synchronize the image data with the LiDAR data by controlling activation of the image sensor based on the information indicative of the first portion of the field of view of the LiDAR sensor.

Clause 11. The apparatus of any one of the preceding clauses, further comprising a memory, and wherein the pre-processor is configured to store the decoded sensor data in a first part of the memory and the parsed sensor data in a second part of the memory.

Clause 12. The apparatus of clause 11, wherein the pre-processor comprises data capture logic communicatively coupled to the decoder, and wherein the data capture logic is configured to:

obtain the decoded sensor data from the decoder and the parsed sensor data from the parser logic; and store the decoded sensor data in the first part of the memory, and the parsed sensor data in the second part of the memory.

Clause 13. The apparatus of any one of clauses 11-12, wherein the second part of the memory is different from the first part of the memory.

Clause 14. The apparatus of any one of the preceding clauses, wherein the parser logic is configured to provide the parsed sensor data as one or more data packets.

Clause 15. The apparatus of any one of the preceding clauses, wherein the decoded sensor data and the parsed sensor data causes the processor to perform fusion of the decoded sensor data and the parsed sensor data.

Clause 16. A method comprising:

receiving, by a pre-processor, sensor data, wherein the sensor data comprises light detection and ranging (LiDAR) data obtained from a LiDAR sensor by scanning an environment;

parsing, by the pre-processor, the sensor data to obtain parsed sensor data;

decoding, by the pre-processor, the parsed sensor data to obtained decoded sensor data; and transmitting, by the pre-processor, the decoded sensor data and the parsed sensor data to a processor, wherein the processor is configured to perform range imaging and a bird eye view imaging based at least in part on the sensor data.

Clause 17. The method of clause 16, wherein decoding the parsed sensor data comprises converting the parsed sensor data from a first coordinate space to a second coordinate space, and wherein the decoded sensor data is in the second coordinate space.

Clause 18. The method of clause 17, wherein transmitting the decoded sensor data and the parsed sensor data to the processor causes the processor to process the sensor data in the first coordinate space and the second coordinate space at least partially in parallel.

Clause 19. The method of any one of the preceding clauses, wherein the LiDAR sensor is one of a plurality of sensors, and wherein receiving the sensor data comprises receiving sensor data from the plurality of sensors;

wherein parsing the sensor data comprises parsing a part of the sensor data received from a first sensor of the plurality of sensors in parallel with at least one other part of the sensor data received from a second sensor of the plurality of sensors; and wherein decoding the parsed sensor data comprises decoding a part of the parsed sensor data corresponding to the part of the sensor data received from the first sensor in parallel with at least one other part of the parsed sensor data corresponding to the part of the sensor data received from the second sensor.

Clause 20. The method of clause 19, wherein at least one of the plurality of sensors is an image sensor.

Clause 21. The method of any of the preceding clauses, wherein the LiDAR sensor operates within a field of view of an environment, and wherein receiving the sensor data comprises receiving a first set of LiDAR data associated with a first portion of the field of view.

Clause 22. The method of clause 21, wherein receiving the sensor data comprises receiving a second set of LiDAR data associated with a second portion of the field of view.

Clause 23. The method of any one of clauses 21-22, wherein the method further comprises using a sector counter to determine information indicative of the first portion of the field of view.

Clause 24. The method of clause 23, wherein the sensor data further comprises image data from an image sensor, wherein the method further comprises synchronizing the image data with the LiDAR data.

Clause 25. The method of clause 24, wherein synchronizing the image data with the LiDAR data comprises activating the image sensor based on the information indicative of the first portion of the field of view of the LiDAR sensor.

Clause 26. The method of any of the preceding clauses, further comprising storing the decoded sensor data in a first part of a memory and the parsed sensor data in a second part of the memory.

Clause 27. The method of clause 26, further comprising:

receiving the decoded sensor data from a decoder and the parsed sensor data from parser logic; and storing the decoded sensor data in the first part of the memory and the parsed sensor data in the second part of the memory.

Clause 28. The method of any one of clauses 26-27, wherein the second part of the memory is different from the first part of the memory.

Clause 29. The method of any one of the preceding clauses, wherein transmitting the parsed sensor data further comprises transmitting the parsed sensor data as one or more data packets.

Clause 30. The method of any one of the preceding clauses, wherein the decoded sensor data and the parsed sensor data are transmitted to the processor to perform fusion of the decoded sensor data and the parsed sensor data.

Clause 31. Non-transitory computer-readable media comprising computer-executable instructions that, when executed by a pre-processor, causes the pre-processor to:

receive sensor data, wherein the sensor data comprises light detection and ranging (LiDAR) data obtained from a LiDAR sensor by scanning an environment;

parse the sensor data to obtain parsed sensor data;

decode the parsed sensor data to obtained decoded sensor data; and transmit the decoded sensor data and the parsed sensor data to a processor, wherein the processor is configured to perform range imaging and a bird eye view imaging based at least in part on the sensor data.

Clause 32. The non-transitory computer-readable media of clause 31, wherein decoding the parsed sensor data comprises converting the parsed sensor data from a first coordinate space to a second coordinate space, and wherein the decoded sensor data is in the second coordinate space.

Clause 33. The non-transitory computer-readable media of clause 32, wherein transmitting the decoded sensor data and the parsed sensor data to the processor enables the processor to process the sensor data in the first coordinate space and the second coordinate space at least partially in parallel.

Clause 34. The non-transitory computer-readable media of any one of the preceding clauses, wherein the LiDAR sensor is one of a plurality of sensors, and wherein receiving the sensor data comprises receiving sensor data from the plurality of sensors;

wherein parsing the sensor data comprises parsing a part of the sensor data received from a first sensor of the plurality of sensors in parallel with at least one other part of the sensor data received from a second sensor of the plurality of sensors; and wherein decoding the parsed sensor data comprises decoding a part of the parsed sensor data corresponding to the part of the sensor data received from the first sensor in parallel with at least one other part of the parsed sensor data corresponding to the part of the sensor data received from the second sensor.

Clause 35. The non-transitory computer-readable media of clause 34, wherein at least one of the plurality of sensors is an image sensor.

Clause 36. The non-transitory computer-readable media of any one of the preceding clauses, wherein the LiDAR sensor operates within a field of view of an environment, and wherein receiving the sensor data comprises receiving a first set of LiDAR data associated with a first portion of the field of view.

Clause 37. The non-transitory computer-readable media of clause 36, wherein receiving the sensor data comprises receiving a second set of LiDAR data associated with a second portion of the field of view.

Clause 38. The non-transitory computer-readable media of any one of clauses 36-37, wherein the computer-executable instructions further cause the pre-processor to use a sector counter to determine information indicative of the first portion of the field of view.

Clause 39. The non-transitory computer-readable media of clause 38, wherein the sensor data further comprises image data from an image sensor, wherein the computer-executable instructions further cause the pre-processor to synchronize the image data with the LiDAR data.

Clause 40. The non-transitory computer-readable media of clause 39, wherein synchronizing the image data with the LiDAR data comprises activating the image sensor based on the information indicative of the first portion of the field of view of the LiDAR sensor.

Clause 41. The non-transitory computer-readable media of any one of the preceding clauses, wherein the computer-executable instructions further cause the pre-processor to store the decoded sensor data in a first part of a memory and the parsed sensor data in a second part of the memory.

Clause 42. The non-transitory computer-readable media of clause 41, wherein the computer-executable instructions further cause the pre-processor to:

receive the decoded sensor data from a decoder and the parsed sensor data from parser logic; and store the decoded sensor data in the first part of the memory and the parsed sensor data in the second part of the memory.

Clause 43. The non-transitory computer-readable media of any one of clauses 41-42, wherein the second part of the memory is different from the first part of the memory.

Clause 44. The non-transitory computer-readable media of any one of the preceding clauses, wherein transmitting the parsed sensor data further comprises transmitting the parsed sensor data as one or more data packets.

Clause 45. The non-transitory computer-readable media of any one of the preceding clauses, wherein the decoded sensor data and the parsed sensor data are transmitted to the processor to perform fusion of the decoded data and the parsed data.

ADDITIONAL EXAMPLES

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. An apparatus comprising:
an input interface configured to receive sensor data from a sensor, wherein the sensor comprises a light detection and ranging (LiDAR) sensor and wherein the sensor data comprises LiDAR data associated with an environment scanned by the LiDAR sensor, wherein the LiDAR sensor operates within a field of view of the environment, wherein the LiDAR data comprises a first set of LiDAR data associated with a first portion of the field of view corresponding to a direction the LiDAR sensor is facing, and wherein the sensor data further comprises image data from an image sensor; and
a pre-processor communicatively coupled to the input interface,
wherein the pre-processor comprises parser logic and a decoder communicatively coupled to the parser logic,
wherein the parser logic comprises a sector counter configured to determine information indicative of the first portion of the field of view, and the parser logic is configured to parse the sensor data to obtain parsed sensor data comprising polar coordinate data,
wherein the decoder is configured to decode the parsed sensor data to obtain decoded sensor data comprising cartesian coordinates, the decoding comprising transforming the polar coordinate data to the cartesian coordinates,
wherein the pre-processor is configured to provide the decoded sensor data and the parsed sensor data to a processor to perform range imaging and a bird eye view imaging based at least in part on at least one of the decoded sensor data or the parsed sensor data, and
wherein the pre-processor is further configured to synchronize the image data with the LiDAR data by controlling timing of activation of the image sensor based on the information indicative of the first portion of the field of view of the LiDAR sensor.

2. The apparatus of claim 1, wherein the decoder is configured to decode the parsed sensor data by converting the parsed sensor data from a first coordinate space to a second coordinate space, and wherein the decoded sensor data is in the second coordinate space.

3. The apparatus of claim 2, wherein providing the decoded sensor data and the parsed sensor data to the processor causes the processor to process the sensor data in the first coordinate space and the second coordinate space at least partially in parallel.

4. The apparatus of claim 1, wherein the input interface is one of a plurality of input interfaces of the apparatus, wherein each input interface of the plurality of input interfaces is configured to obtain input sensor data from a corresponding sensor of a plurality of sensors, and wherein the pre-processor comprises:

a plurality of parser logics, wherein each parser logic of the plurality of parser logics is communicatively coupled to a corresponding input interface of the plurality of input interfaces, wherein each parser logic is configured to parse the sensor data from the corresponding input interface in parallel with at least one other parser logic of the plurality of parser logics; and a plurality of decoders, wherein each decoder of the plurality of decoders is communicatively coupled to a corresponding parser logic of the plurality of parser logics, wherein each decoder is configured to decode the parsed sensor data from the corresponding parser logic in parallel with at least one other decoder of the plurality of decoders.

5. The apparatus of claim 4, wherein at least one of the plurality of sensors is an image sensor.

6. The apparatus of claim 1, wherein the input interface is configured to obtain a second set of LiDAR data associated with a second portion of the field of view.

7. The apparatus of claim 1, further comprising a memory, and wherein the pre-processor is configured to store the decoded sensor data in a first part of the memory and the parsed sensor data in a second part of the memory.

8. The apparatus of claim 7, wherein the pre-processor comprises data capture logic communicatively coupled to the decoder, and wherein the data capture logic is configured to:

obtain the decoded sensor data from the decoder and the parsed sensor data from the parser logic; and store the decoded sensor data in the first part of the memory, and the parsed sensor data in the second part of the memory.

9. The apparatus of claim 1, wherein the decoded sensor data and the parsed sensor data are provided to the processor to perform fusion of the decoded sensor data and the parsed sensor data.

10. A method comprising:

receiving, by a pre-processor, sensor data, wherein the sensor data comprises light detection and ranging (LiDAR) data obtained from a LiDAR sensor by scanning an environment, wherein the LiDAR sensor operates within a field of view of the environment, wherein receiving the sensor data comprises receiving a first set of LiDAR data associated with a first portion of the field of view corresponding to a direction the LiDAR sensor is facing, and wherein the sensor data further comprises image data from an image sensor;

using a sector counter to determine information indicative of the first portion of the field of view;

synchronizing the image data with the LiDAR data by controlling timing of activation of the image sensor based on the information indicative of the first portion of the field of view of the LiDAR sensor;

parsing, by the pre-processor, the sensor data to obtain parsed sensor data comprising polar coordinate data;

decoding, by the pre-processor, the parsed sensor data to obtain decoded sensor data comprising cartesian coordinates, the decoding comprising transforming the polar coordinate data to the cartesian coordinates; and transmitting, by the pre-processor, the decoded sensor data and the parsed sensor data to a processor to perform range imaging and a bird eye view imaging based at least in part on the sensor data.

11. The method of claim 10, wherein decoding the parsed sensor data comprises converting the parsed sensor data from a first coordinate space to a second coordinate space, wherein the decoded sensor data is in the second coordinate space, and wherein transmitting the decoded sensor data and the parsed sensor data to the processor enables the processor to process the sensor data in the first coordinate space and the second coordinate space at least partially in parallel.

12. The method of claim 10, wherein the LiDAR sensor is one of a plurality of sensors, and wherein receiving the sensor data comprises receiving sensor data from the plurality of sensors;

wherein parsing the sensor data comprises parsing a part of the sensor data received from a first sensor of the plurality of sensors in parallel with at least one other part of the sensor data received from a second sensor of the plurality of sensors; and wherein decoding the parsed sensor data comprises decoding a part of the parsed sensor data corresponding to the part of the sensor data received from the first sensor in parallel with at least one other part of the parsed sensor data corresponding to the part of the sensor data received from the second sensor.

13. The method of claim 10, wherein the LiDAR sensor operates within a field of view of an environment, wherein receiving the sensor data comprises receiving a first set of LiDAR data associated with a first portion of the field of view and receiving a second set of LiDAR data associated with a second portion of the field of view.

14. The method of claim 13, wherein the method further comprises using a sector counter to determine information indicative of the first portion of the field of view.

15. The method of claim 14, wherein the sensor data further comprises image data from an image sensor, wherein the method further comprises synchronizing the image data with the LiDAR data by activating the image sensor based on the information indicative of the first portion of the field of view of the LiDAR sensor.

16. Non-transitory computer-readable media comprising computer-executable instructions that, when executed by a pre-processor, causes the pre-processor to:

receive sensor data, wherein the sensor data comprises light detection and ranging (LiDAR) data obtained from a LiDAR sensor by scanning an environment, wherein the LiDAR sensor operates within a field of view of an environment, and wherein receiving the sensor data comprises receiving a first set of LiDAR data associated with a first portion of the field of view corresponding to a direction the LiDAR sensor is facing, and wherein the sensor data further comprises image data from an image sensor;

use a sector counter to determine information indicative of the first portion of the field of view;

synchronize the image data with the LiDAR data by controlling timing of activation of the image sensor based on the information indicative of the first portion of the field of view of the LiDAR sensor;

parse the sensor data to obtain parsed sensor data comprising polar coordinate data;

decode the parsed sensor data to obtained decoded sensor data comprising cartesian coordinates, the decoding comprising transforming the polar coordinate data to the cartesian coordinates; and transmit the decoded sensor data and the parsed sensor data to a processor to perform range imaging and a bird eye view imaging based at least in part on the sensor data.

\* \* \* \* \*